US012339573B2

(12) United States Patent
Yoneyama

(10) Patent No.: US 12,339,573 B2
(45) Date of Patent: Jun. 24, 2025

(54) LIGHT SOURCE DEVICE AND PROJECTOR

(71) Applicant: SEIKO EPSON CORPORATION, Tokyo (JP)

(72) Inventor: Takuo Yoneyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 304 days.

(21) Appl. No.: 18/079,521

(22) Filed: Dec. 12, 2022

(65) Prior Publication Data

US 2023/0185175 A1 Jun. 15, 2023

(30) Foreign Application Priority Data

Dec. 13, 2021 (JP) ................................. 2021-201470

(51) Int. Cl.
*G03B 21/20* (2006.01)
*H04N 9/31* (2006.01)

(52) U.S. Cl.
CPC ....... *G03B 21/204* (2013.01); *G03B 21/2013* (2013.01); *G03B 21/2066* (2013.01); *H04N 9/3161* (2013.01); *H04N 9/3164* (2013.01)

(58) Field of Classification Search
CPC .............. G03B 21/204; G03B 21/2013; G03B 21/2066; H04N 9/3161; H04N 9/3164
USPC .......................................................... 353/31
See application file for complete search history.

(56) References Cited

U.S. PATENT DOCUMENTS

| 2013/0194552 A1 | 8/2013 | Matsubara et al. |
| 2013/0329448 A1 | 12/2013 | Franz et al. |
| 2018/0239230 A1* | 8/2018 | Pettitt ................... H04N 9/3105 |
| 2022/0132086 A1* | 4/2022 | Liao .................... G03B 21/2066 |

FOREIGN PATENT DOCUMENTS

| JP | 2012-141495 A | 7/2012 |
| JP | 2014-507055 A | 3/2014 |
| JP | 2021-156998 A | 10/2021 |
| WO | 2012/053057 A1 | 4/2012 |

* cited by examiner

*Primary Examiner* — Jerry L Brooks
(74) *Attorney, Agent, or Firm* — Oliff PLC

(57) ABSTRACT

A light source device includes a first light source configured to emit first light having a first wavelength, a second light source configured to emit second light, a wavelength conversion element having a first surface which the second light emitted from the second light source enters and a second surface located at an opposite side to the first surface, and configured to convert the second light into third light having a second wavelength, an optical member configured to combine the first light and the third light to emit combined light, and a reflecting member configured to reflect, toward the optical member, the first light which is a part of the first light emitted from the first light source and which is emitted from the optical member. The first light reflected by the reflecting member enters the second surface via the optical member, and is converted into the third light.

10 Claims, 11 Drawing Sheets

LIGHT SOURCE DEVICE AND PROJECTOR

The present application is based on, and claims priority from JP Application Serial Number 2021-201470, filed Dec. 13, 2021, the disclosure of which is hereby incorporated by reference herein in its entirety.

BACKGROUND

1. Technical Field

The present disclosure relates to a light source device and a projector.

2. Related Art

In an image display device such as a projector, there is used, in some cases, a light source device provided with a fluorescence source in which an excitation light source such as a semiconductor laser (Laser Diode; LD) for emitting excitation light, and a phosphor for converting at least a part of the excitation light emitted from the excitation light source into fluorescence having a wavelength different from that of the excitation light are combined with each other, and a light source which is configured independently of the fluorescence source, and which emits light having a predetermined wavelength.

For example, in JP-T-2014-507055 (Document 1) (the term "JP-T" as used herein means a published Japanese translation of a PCT patent application), there is disclosed a device provided with an excitation light source for emitting blue light as the excitation light, a phosphor element including a phosphor for converting at least a part of the excitation light into yellow light, a solid-state light source for emitting blue light other than the excitation light, and an optical system for guiding the excitation light to the phosphor element, and then mixing the blue light and the yellow light having been converted with each other to generate white light. The optical system includes a dichroic mirror which reflects the blue light and transmits the yellow light.

In the device disclosed in Document 1 described above, the light intensity of the yellow light emitted from the phosphor is apt to be relatively insufficient to the blue light emitted from the light source such as the LD, and there is created the state in which the emission capacity of the blue light in the whole device is superfluous. In such a case, it is necessary to decrease the light intensity of the blue light in accordance with the light intensity of the yellow light when producing a proper balance between red light, green light, and the blue light, and as a result, there is a possibility that the light intensity of the white light to be emitted from the optical system and the whole device becomes lower than the desired light intensity. Further, when the light intensity of the white light becomes insufficient as described above, there is a possibility that a luminance of an image in the projector equipped with the device decreases.

SUMMARY

In view of the problems described above, a light source device according to an aspect of the present disclosure includes a first light source configured to emit first light having a first wavelength, a second light source configured to emit second light, a wavelength conversion element having a first surface which the second light emitted from the second light source enters and a second surface located at an opposite side to the first surface, the wavelength conversion element being configured to convert the second light into third light having a second wavelength different from the first wavelength, an optical member configured to combine the first light and the third light with each other to emit combined light, and a reflecting member configured to reflect, toward the optical member, the first light which is a part of the first light emitted from the first light source and which is emitted from the optical member. The first light reflected by the reflecting member enters the second surface of the wavelength conversion element via the optical member, and is converted into the third light.

DESCRIPTION OF EXEMPLARY EMBODIMENTS

First Embodiment

A first embodiment of the present disclosure will hereinafter be described using FIG. 1 through FIG. 3.

Figure 1:
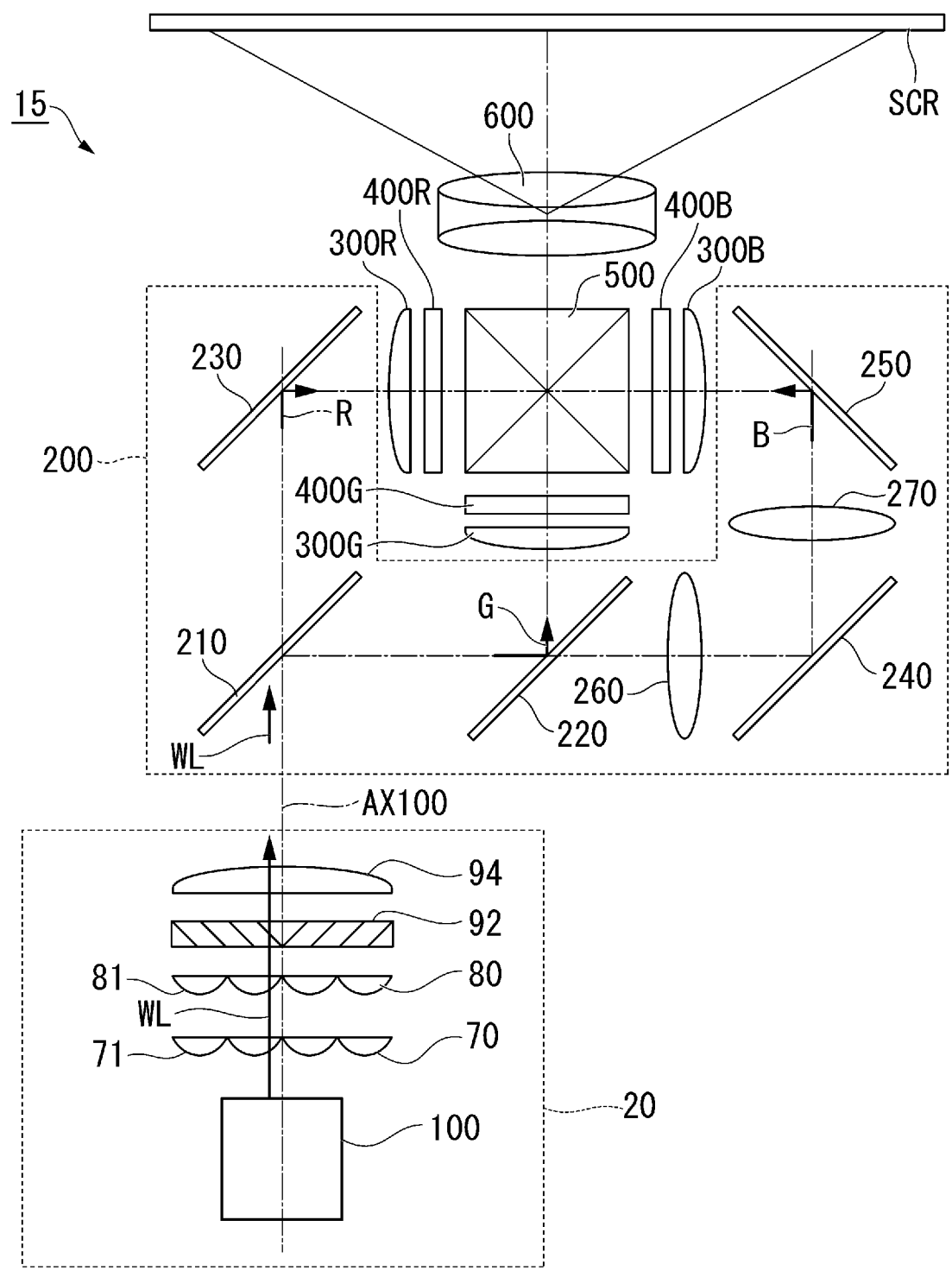
FIG. 1 is a configuration diagram of a projector according to a first embodiment.

FIG. 1 is a schematic view showing a configuration of a projector 15 according to the first embodiment. The projector 15 is an image display device using liquid crystal panels as light modulation devices. In the drawings described below, in order to make constituents eye-friendly, the scale ratio of the size is made different by the constituents in some cases.

Projector

As shown in FIG. 1, the projector 15 is provided with an illumination device 20, a color separation optical system 200, field lenses 300R, 300G, and 300B, light modulation devices 400R, 400G, and 400B, a cross dichroic prism 500, and a projection optical system 600. The illumination device 20 emits white light (light) WL obtained by combining red light R, green light G, and blue light B with each other.

The illumination device 20 is provided with a light source device 100, a first lens array 70, a second lens array 80, a polarization conversion element 92, and a superimposing lens 94. The light source device 100 emits the white light WL. A configuration of the light source device 100 will be described later.

The white light WL emitted from the light source device 100 is collimated, and then enters the first lens array 70. The first lens array 70 has a plurality of small lenses 71 for dividing the white light WL emitted from the light source device 100 into a plurality of partial light beams. The plurality of small lenses 71 is arranged in a matrix in a plane perpendicular to an optical axis AX100 of the light source device 100.

The second lens array 80 has a plurality of small lenses 81 corresponding respectively to the plurality of small lenses 71 of the first lens array 70. The plurality of small lenses 81 is arranged in a matrix in a plane perpendicular to the optical axis AX100. The second lens array 80 focuses an image of each of the small lenses 71 of the first lens array 70 in the vicinity of each of the image forming areas of the light modulation devices 400R, 400G, and 400B in cooperation with the superimposing lens 94.

The polarization conversion element 92 has a polarization separation layer, a reflecting layer, and a wave plate not shown. The polarization conversion element 92 converts the partial light beams emitted from the second lens array 80 into linearly polarized light. The polarization conversion element 92 is formed to have a plate shape as a whole. A plate surface of the polarization conversion element 92 is arranged in parallel to a plane perpendicular to the optical axis AX100. The polarization separation layer of the polarization conversion element 92 transmits one of the linear polarization components included in the partial light beams emitted from the second lens array 80, and reflects the other of the linear polarization components in a direction perpendicular to the optical axis AX100. The reflecting layer of the polarization conversion element 92 reflects the other linear polarization component reflected by the polarization separation layer in a direction parallel to the optical axis AX100. The wave plate of the polarization conversion element 92 converts the other linear polarization component reflected by the reflecting layer into the one linear polarization component.

The superimposing lens 94 collects the partial light beams from the polarization conversion element 92 to thereby superimpose the partial light beams in the vicinity of each of the image forming areas of the light modulation devices 400R, 400G, and 400B. The first lens array 70, the second lens array 80, and the superimposing lens 94 constitute an integrator optical system. The integrator optical system homogenizes an in-plane light intensity distribution of the white light WL emitted from the illumination device 20 in each of the image forming areas of the light modulation devices 400R, 400G, and 400B.

The color separation optical system 200 is provided with dichroic mirrors 210, 220, reflecting mirrors 230, 240, and 250, and relay lenses 260, 270. The color separation optical system 200 separates the white light WL emitted from the illumination device 20 into the red light R, the green light G, and the blue light B, and then guides the red light R, the green light G, and the blue light B to the light modulation devices 400R, 400G, and 400B, respectively.

The dichroic mirror 210 transmits the red light R and reflects the green light G and the blue light B out of the white light WL entering the dichroic mirror 210. The dichroic mirror 220 reflects the green light G and transmits the blue light B out of the green light G and the blue light B entering the dichroic mirror 220. The reflecting mirror 230 reflects substantially all of the red light R entering the reflecting mirror 230. The reflecting mirrors 240, 250 each reflect substantially all of the blue light B entering the reflecting mirrors 240, 250.

The field lens 300R is arranged between the color separation optical system 200 and the light modulation device 400R on the light path of the red light R, the field lens 300G is arranged between the color separation optical system 200 and the light modulation device 400G on the light path of the green light G, and the field lens 300B is arranged between the color separation optical system 200 and the light modulation device 400B on the light path of the blue light B. The red light R reflected by the reflecting mirror 230 is transmitted through the field lens 300R, and then enters the image forming area of the light modulation device 400R. The green light G reflected by the dichroic mirror 220 is transmitted through the field lens 300G, and then enters the image forming area of the light modulation device 400G. The blue light B reflected by the reflecting mirror 250 is transmitted through the field lens 300B, and then enters the image forming area of the light modulation device 400B.

The light modulation device 400R is formed of a liquid crystal panel for modulating the red light R entering the light modulation device 400R in accordance with image information to form an image, the light modulation device 400G is formed of a liquid crystal panel for modulating the green light G entering the light modulation device 400G in accordance with the image information to form an image, and the light modulation device 400B is formed of a liquid crystal panel for modulating the blue light B entering the light modulation device 400B in accordance with the image information to form an image. An operation mode of the liquid crystal panel can be any of a TN mode, a VA mode, a transverse electric field mode, and so on, and is not limited to a specific mode. Each of the light modulation devices 400R, 400G, and 400B is provided with an incident side polarization plate (not shown) arranged at a plane of incidence of light side, and an exit side polarization plate (not shown) arranged at a light exit surface side.

The cross dichroic prism 500 combines the image light emitted from the light modulation device 400R, the image light emitted from the light modulation device 400G, and the image light emitted from the light modulation device 400B with each other to form a color image. As shown in FIG. 1, the cross dichroic prism 500 is constituted by four rectangular prisms arranged so that the respective vertex angles overlap each other at a common central position in a side view, and is formed to have a substantially cubic shape as a whole. In the cross dichroic prism 500, on interfacial surfaces on which the rectangular prisms are bonded to each other, there are formed dielectric multilayer films not shown. The interfacial surfaces described above are formed to have a substantially X shape in the side view.

The color image emitted from the cross dichroic prism 500 is projected in an enlarged manner by the projection optical system 600 to form an image on a screen SCR.

Light Source Device

Then, a configuration of the light source device 100 in the projector 15 described above will be explained.

Figure 2:
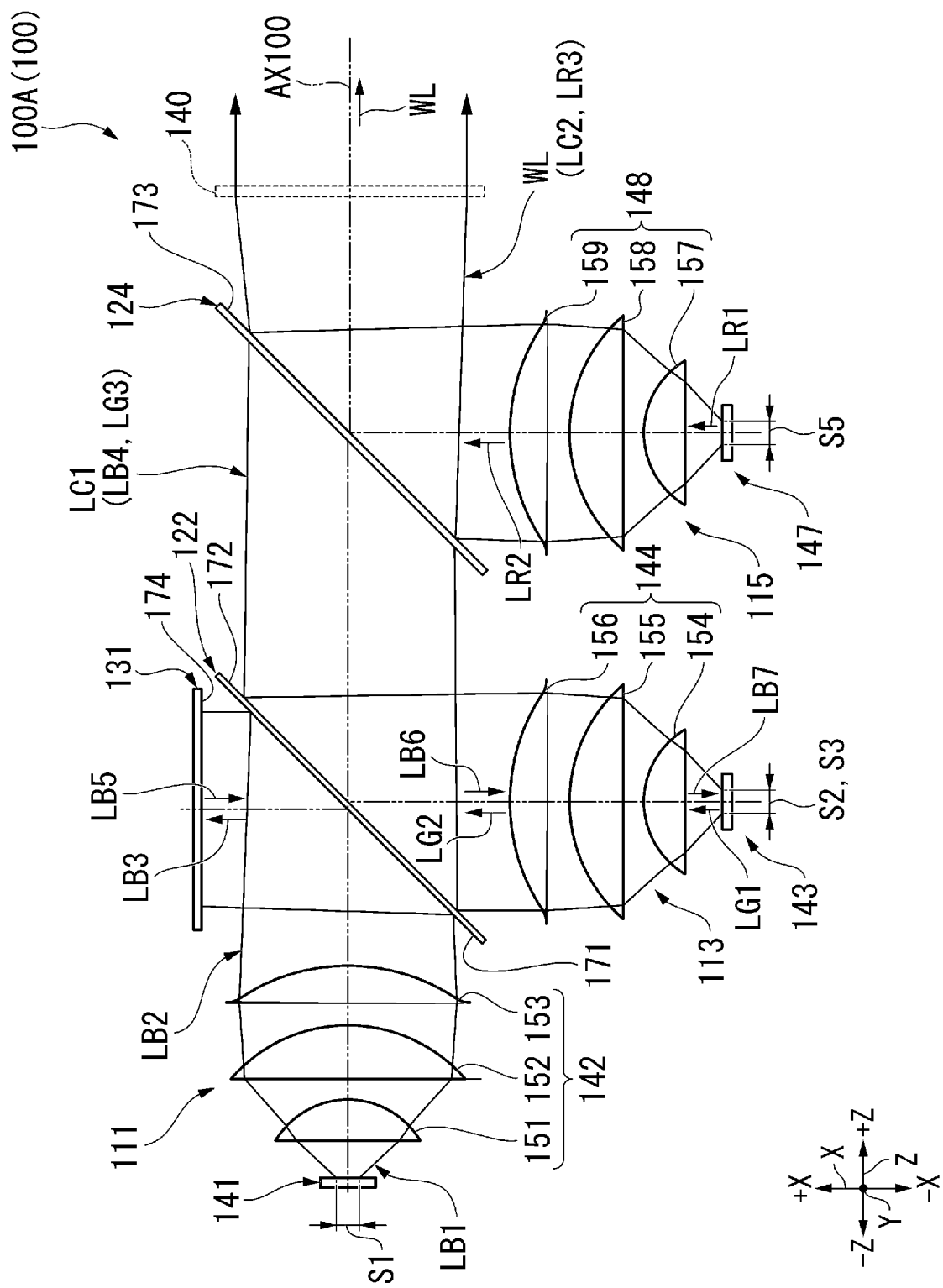
FIG. 2 is a configuration diagram of a light source device provided to the projector shown in FIG. 1.

FIG. 2 is a configuration diagram of the light source device 100A according to the first embodiment. As shown in FIG. 2, the light source device 100A is provided with light source units 111, 113, and 115, combining mirrors 122, 124, and a reflecting mirror 131. In the specification and the drawings described below, a direction parallel to the optical axis AX100 of the white light WL emitted from the light source device 100A is defined as a Z direction, a relatively near side to an exit side of the light source device 100A in the Z direction is defined as a +Z side, and a relatively opposite side to the exit side in the Z direction is referred to as a −Z side. Further, one direction perpendicular to the Z direction is defined as an X direction, relatively one side in the X direction is defined as a +X side, and relatively the other side in the X direction is referred to as a −X side. Further, a direction perpendicular to both of the X direction and the Z direction is defined as a Y direction, relatively one side in the Y direction is defined as a +Y side, and relatively the other side in the Y direction is referred to as a −Y side.

The light source unit 111 is arranged on the optical axis AX100, and is arranged at the −Z side of the first lens array 70 described with reference to FIG. 1. The light source unit 111 is provided with a first light source 141 and a pickup optical system 142. The first light source 141 emits blue light (first light) LB1 having a blue wavelength (a first wavelength). The first light source 141 is provided with a solid-state light source such as an LD or a light emitting diode (LED) formed so as to be able to emit, for example, the blue light LB1. The first light source 141 has a light emitting element not shown and capable of emitting, for example, the blue light LB1, and a substrate not shown for supporting the light emitting element. A peak wavelength of the blue light LB1 is included in a range of, for example, 440 nm through 480 nm, but is sufficiently a wavelength belonging to a blue color in the visible wavelength band, and is not limited to a specific value. A dimension in an X-Y plane including the X direction and the Y direction of a light emitting area of the blue light LB1 in the first light source 141, namely a beam diameter of the blue light LB1 immediately after being emitted from the first light source 141, is defined as S1.

The pickup optical system 142 is arranged at the +Z side of the first light source 141 on the optical axis AX100. The pickup optical system 142 has, for example, a first lens 151, a second lens 152, and a third lens 153. The first lens 151, the second lens 152, and the third lens 153 are arranged at intervals in sequence from the −Z side to the +Z side in a state in which the respective axial cores coincide with the optical axis AX100. The first lens 151 and the second lens 152 are each constituted by a convex lens having a flat surface at an incident side parallel to, for example, the X-Y plane, and a spherical surface at an exit side moving toward the +Z side as proceeding from an outer circumferential edge of the flat surface at the incident side toward the axial core. The third lens 153 is constituted by a convex lens having a flat surface at an incident side parallel to, for example, the X-Y plane, and an aspherical surface at an exit side moving from the −Z side toward the +Z side as proceeding from an outer circumferential edge of the flat surface at the incident side toward the axial core.

It should be noted that the number, the arrangement, and the shapes of the lenses constituting, for example, the pickup optical system 142 are appropriately set taking an installable distance in the Z direction of the pickup optical system 142 into consideration so as to take the blue light LB1 emitted with the beam diameter S1 from the light emitting area of the first light source 141 as much as possible, and at the same time, enlarge the blue light LB1 to have a desired beam diameter at the +Z side of the pickup optical system 142. The pickup optical system 142 magnifies the blue light LB1 entering the pickup optical system 142 from the first light source 141 into blue light (first light) LB2 having a beam diameter substantially equivalent to the beam diameter required for the white light WL entering the image forming area of each of the light modulation devices 400R, 400G, and 400B described with reference to FIG. 1, and then emits the blue light LB2 toward the +Z side along the Z direction.

The light source unit 113 is arranged at the −X side of the light path of the blue light LB2 in the X direction, overlaps the light path of the blue light LB2 in the Y direction, and is arranged at the +Z side of the light source unit 111 in the Z direction. The light source unit 113 is provided with a wavelength converter 143 and a pickup optical system 144. The wavelength converter 143 emits green light (third light) LG1.

Figure 3:
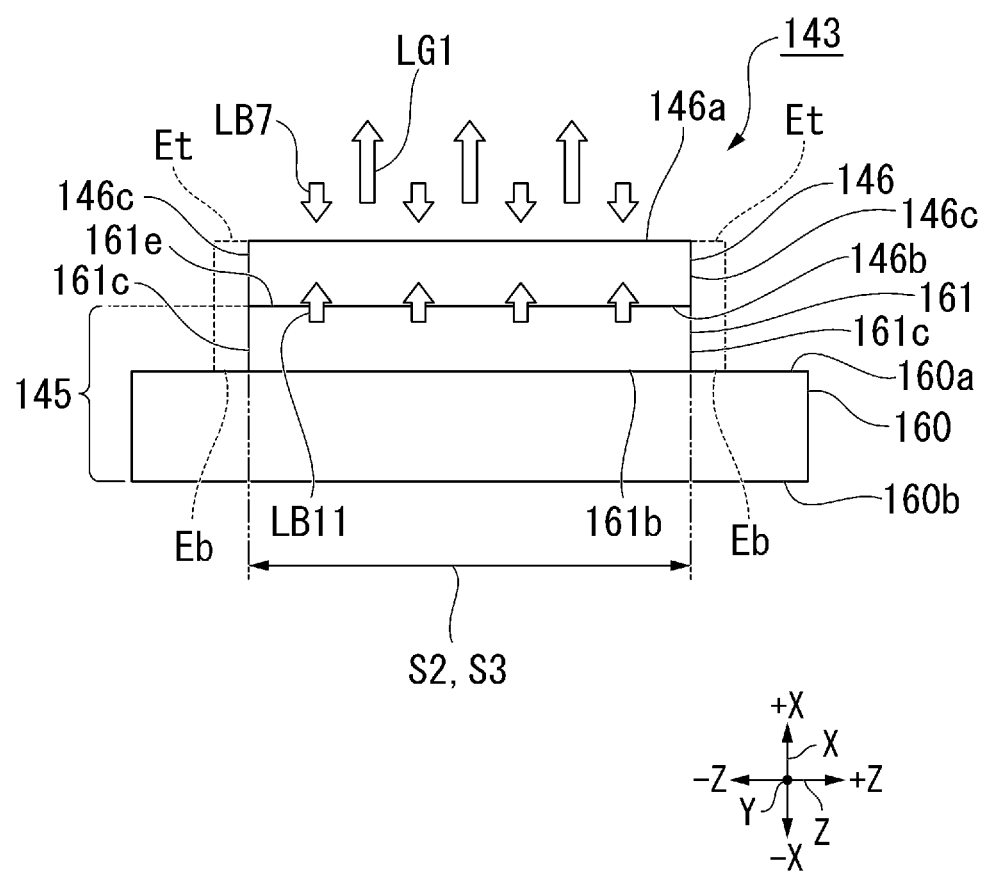
FIG. 3 is a diagram showing a configuration of a wavelength converter of the light source device shown in FIG. 2.

FIG. 3 is a diagram showing a configuration when viewing the wavelength converter 143 along the Y direction. As shown in FIG. 3, the wavelength converter 143 is provided with a second light source 145 for emitting blue light (second light) LB11 having a blue wavelength, and a wavelength conversion element 146 for converting the blue light entering the wavelength conversion element 146 including the blue light LB11 into the green light LG1. The second light source 145 is constituted by a solid-state light source such as an LED formed so as to be able to emit the blue light LB11, and is provided with, for example, a substrate 160 and a light emitting element 161. The substrate 160 has plate surfaces 160a, 160b parallel to a Y-Z plane including the Y direction and the Z direction, and has a predetermined thickness along the X direction.

The light emitting element 161 is directly stacked on the plate surface 160a at the +X side of the substrate 160. The light emitting element 161 has an exit surface 161e and a contact surface 161b parallel to the Y-Z plane, and emits the blue light LB11 from the exit surface 161e toward the +X side along the X direction. The peak wavelength of the blue light LB11 is within a range of, for example, 440 nm through 480 nm similarly to, for example, the blue light LB1, but is sufficiently a wavelength capable of exciting the wavelength conversion element 146 so that the green light LG1 is emitted from the wavelength conversion element 146, and is not limited to a specific value.

The contact surface 161b of the light emitting element 161 has contact with the plate surface 160a of the substrate 160. A size on the Y-Z plate of the light emitting area of the blue light LB11 in the light emitting element 161 is smaller than the plate surfaces 160a, 160b of the substrate 160. An average dimension on the Y-Z plane of the light emitting element 161 of the second light source 145, namely a beam diameter of the blue light LB11 immediately after being emitted from the second light source 145, is defined as S2.

The wavelength conversion element 146 is stacked on the exit surface 161e of the light emitting element 161 of the second light source 145. The wavelength conversion element 146 has a first surface 146b at the −X side and a second surface 146a at the +X side parallel to the Y-Z plane. It is preferable for the first surface 146b of the wavelength conversion element 146 to have contact with the exit surface 161e of the light emitting element 161. As one illustrative example, defining an area covering the side surface 161c of the light emitting element 161 and a side surface 146c of the wavelength conversion element 146 from the outside on the Y-Z plane as Et, it is possible for the wavelength conversion element 146 to extend in the area Et, and it is possible for an end surface Eb at a −X extreme side of the wavelength conversion element 146 and the plate surface 160a of the substrate 160 to be bonded to each other with light curing resin for sealing or an adhesive. As another illustrative example, it is possible to arrange the light curing resin for sealing or an arbitrary sealing material in the area Et. In either of the illustrative examples, an air layer does not intervene between the first surface 146b of the wavelength conversion element 146 and the exit surface 161e of the light emitting element 161, but the first surface 146b and the exit surface 161e have contact with each other.

It is preferable for at least the air layer, or a layer which is high in refractive index difference from the light emitting element 161 and the wavelength conversion element 146, and which causes a loss of the blue light LB11 emitted by the light emitting element 161 not to intervene between the exit surface 161e of the light emitting element 161 and the first surface 146b of the wavelength conversion element 146 in the X direction.

It should be noted that it is possible for a cover member not shown and formed of, for example, optical glass to have a plate shape at the +X side of the exit surface 161e of the light emitting element 161 in a state of having contact with the exit surface 161e. On that occasion, the light emitting element 161 and the wavelength conversion element 146 are adjacent to each other in the X direction via the cover member described above. A surface at the +X side of the cover member described above has contact with the first surface 146b of the wavelength conversion element 146.

The blue light LB11 having been emitted from the light emitting element 161 of the second light source 145 enters the wavelength conversion element 146 from the first surface 146b. The second surface 146a is located at the +X side of the first surface 146b. As described later, blue light LB7 as a part (at least a part) of the blue light LB1 emitted from the first light source 141 enters the wavelength conversion element 146 from the second surface 146a. The wavelength conversion element 146 generates the green light LG1 as the fluorescence using the blue light LB7, LB11 entering the wavelength conversion element 146 as the excitation light to thereby perform the wavelength conversion on the blue light LB7, LB11 into the green light LG1. The green light LG1 has a green wavelength (a second wavelength). The green wavelength is included in a range of, for example, 500 nm through 570 nm, but is sufficiently a wavelength belonging to a green color in the visible wavelength band, and is not limited to a specific value.

A material of the wavelength conversion element 146 is any one of a $Lu_3Al_5O_{12}:Ce^{3+}$ phosphor, a $Y_3O_4:Eu^{2+}$ phosphor, a $(Ba,Sr)_2SiO_4:Eu^{2+}$ phosphor, a $Ba_3Si_6O_{12}N_2:Eu^{2+}$ phosphor, and a $(Si,Al)_6(O,N)_8:Eu^{2+}$ phosphor. It should be noted that it is sufficient for the material of the wavelength conversion element 146 to be a material capable of performing the wavelength conversion on the blue light LB7, LB11 into the green light LG1 having a desired green wavelength, and is not limited to a specific material.

A size on the Y-Z plane of the wavelength conversion element 146 is equivalent to the light emitting element 161 of the second light source 145, and is smaller than the substrate 160. An average dimension on the Y-Z plane of the light emitting area of the green light LG1 in the wavelength conversion element 146, namely a beam diameter of the green light LG1 immediately after being emitted from the wavelength conversion element 146, is defined as S3. The beam diameter S3 of the green light LG1 is preferably no larger than twice of the beam diameter S1 of the blue light LB1, and is more preferably equivalent to the beam diameter S1.

As shown in FIG. 2, the pickup optical system 144 is arranged between a light path of the blue light LB2 and the wavelength conversion element 146 of the light source unit 113 in the X direction, and is arranged at the +X side of the second light source 145 and the wavelength conversion element 146. The pickup optical system 144 has, for example, a first lens 154, a second lens 155, and a third lens 156. The first lens 154 has a flat surface at an incident side parallel to, for example, the Y-Z plane and a spherical surface at an exit side moving toward the +X side as proceeding from an outer circumferential edge of the flat surface at the incident side toward the axial core, and is formed of a convex lens similarly to the first lens 151 of the pickup optical system 142. The second lens 155 has a flat surface at an incident side parallel to, for example, the Y-Z plane and a spherical surface at an exit side moving from the −X side toward the +X side as proceeding from an outer circumferential edge of the flat surface at the incident side toward the axial core, and is formed of a convex lens similarly to the second lens 152 of the pickup optical system 142. The third lens 156 has a flat surface at an incident side parallel to, for example, the Y-Z plane and an aspherical surface at an exit side moving toward the +X side as proceeding from an outer circumferential edge of the flat surface at the incident side toward the axial core, and is formed of a convex lens similarly to the third lens 153 of the pickup optical system 142.

It should be noted that the number, the arrangement, and the shapes of the lenses constituting the pickup optical system 144 are appropriately selected taking, for example, an installable distance in the X direction of the pickup optical system 144 into consideration so as to take the green light LG1 emitted with the beam diameter S3 from the wavelength conversion element 146 as much as possible, and at the same time, enlarge the green light LG1 to have a desired beam diameter at the +X side of the pickup optical system 144. The pickup optical system 144 enlarges the green light LG1 entering the pickup optical system 144 from the wavelength conversion element 146 into green light (third light) LG2 having a beam diameter substantially equivalent to that of the blue light LB2, and then emits the green light LG2 toward the +X side along the X direction.

The light source unit 115 is arranged at the −X side of the light path of the blue light LB2 and substantially overlaps the light source unit 113 in the X direction, overlaps the light path of the blue light LB2 in the Y direction, and is arranged at the +Z side of the light source unit 113 in the Z direction. The light source unit 115 is provided with a third light source 147 and a pickup optical system 148. The third light source 147 emits red light LR1 having a red wavelength. The third light source 147 is provided with a solid-state light source such as an LD or an LED formed so as to be able to emit, for example, the red light LR1. The third light source 147 has a light emitting element not shown and capable of emitting, for example, the red light LR1, and a substrate not shown for supporting the light emitting element. A peak wavelength of the red light LR1 is included in a range of, for example, 600 nm through 800 nm, but is sufficiently a wavelength belonging to a red color in the visible wavelength band, and is not limited to a specific value.

An average dimension on the Y-Z plane of the light emitting area of the red light LR1 in the third light source 147, namely a beam diameter of the red light LR1 immediately after being emitted from the third light source 147, is defined as S5. It is preferable for the beam diameter S5 of the red light LR1 to be equivalent to the beam diameter S1 of the blue light LB1.

The pickup optical system 148 is arranged between the light path of the blue light LB2 and the light source unit 115 in the X direction, and is arranged at the +X side of the third light source 147. The pickup optical system 148 has, for example, a first lens 157, a second lens 158, and a third lens 159. The first lens 157 is formed of a convex lens having a flat surface at an incident side and a spherical surface at an exit side similarly to, for example, the first lens 154 of the pickup optical system 144. The second lens 158 is formed of a convex lens having a flat surface at an incident side and a spherical surface at an exit side similarly to, for example, the second lens 155 of the pickup optical system 144. The third lens 159 is formed of a convex lens having a flat surface at an incident side and an aspherical surface at an exit side similarly to, for example, the third lens 156 of the pickup optical system 144.

It should be noted that the number, the arrangement, and the shapes of the lenses constituting the pickup optical system 148 are appropriately selected taking, for example, an installable distance in the X direction of the pickup optical system 148 into consideration so as to take the red light LR1 emitted with the beam diameter S5 from the third light source 147 as much as possible, and at the same time, enlarge the red light LR1 to have a desired beam diameter at the +X side of the pickup optical system 148. The pickup optical system 148 enlarges the red light LR1 entering the pickup optical system 148 from the third light source 147 into red light LR2 having a beam diameter substantially equivalent to that of the blue light LB2, and then emits the red light LR2 toward the +X side along the X direction.

The combining mirror (an optical member) 122 is arranged in an area where the light path of the blue light LB2 emitted from the pickup optical system 142 of the light source unit 111 and the light path of the green light LG2 emitted from the pickup optical system 144 of the light source unit 113 are combined with each other. The combining mirror 122 is formed to have a plate shape, and has a first reflecting surface 171, and a second reflecting surface 172 at an opposite side to the first reflecting surface 171. The first reflecting surface 171 and the second reflecting surface 172 are arranged in parallel to each other. The second reflecting surface 172 is located at the +Z side of the first reflecting surface 171. The first reflecting surface 171 and the second reflecting surface 172 are arranged so as to move from the −Z side toward the +Z side as proceeding from an end at the −X side toward the +X side, so as to form an angle of about 45° with respect to each of the X direction and the Z direction, and so as to be parallel to the Y direction.

A part of the blue light LB2 entering the first reflecting surface 171 from the −Z side along the Z direction is reflected by the first reflecting surface 171 toward the +X side along the X direction as blue light (first light) LB3. The first reflecting surface 171 transmits at least a part (another part) of the rest of the blue light LB2 entering the first reflecting surface 171 as described above toward the +Z side along the Z direction. The blue light LB2 transmitted through the first reflecting surface 171 is refracted by the combining mirror 122, and is emitted from the second reflecting surface 172 toward the +Z side along the Z direction as blue light LB4. For example, assuming the light intensity of the blue light LB2 entering the first reflecting surface 171 as 100%, the light intensity of the blue light LB3 emitted from the first reflecting surface 171 toward the +X side is appropriately adjusted within a range of about 20% through 50%.

The green light LG2 entering the second reflecting surface 172 from the −X side along the X direction is reflected by the second reflecting surface 172 toward the +Z side along the Z direction as green light LG3. For example, assuming the light intensity of the green light LG2 entering the second reflecting surface 172 as 100%, the light intensity of the green light LG3 emitted from the second reflecting surface 172 is appropriately adjusted within a range of about 50% through 95%.

The blue light LB4 and the green light LG3 emitted from the second reflecting surface 172 toward the +Z side along the Z direction are combined with each other when being emitted from the second reflecting surface 172, and thus, cyan light (combined light) LC1 is generated. In other words, the combining mirror 122 combines the blue light (first light) LB4 as a part of the blue light LB1 emitted from the first light source 141 and the green light (third light) LG3 as at least a part of the green light LG1 emitted from the wavelength conversion element 146 with each other, and then emits the cyan light LC1 toward the +Z side along the Z direction.

The combining mirror 122 has, for example, a first mirror substrate not shown, a first dielectric multilayer film (not shown) forming the first reflecting surface 171, and a second dielectric multilayer film (not shown) forming the second reflecting surface 172. The first mirror substrate is arranged so as to form an angle of about 45° with respect to each of the X direction and the Z direction as described above, and so as to be parallel to the Y direction. The first mirror substrate is formed of a material capable of transmitting at least blue light, and is formed of, for example, optical glass which transmits light in the visible wavelength band. The first dielectric multilayer film is stacked on a plate surface of the first mirror substrate facing to the light source unit 111 using a manufacturing method such as evaporation coating. The first dielectric multilayer film is designed taking a peak wavelength and so on of the blue light LB2 into consideration so as to reflect a part of the blue light LB2 entering the first dielectric multilayer film as the blue light LB3, and at the same time so as to transmit at least a part of the rest thereof as described above. The second dielectric multilayer film is stacked on a plate surface of the first mirror substrate facing to the light source unit 113 using a manufacturing method such as evaporation coating. The second dielectric multilayer film is designed taking a peak wavelength and so on of the green light LG2 into consideration so as to reflect the green light LG2 entering the second dielectric multilayer film as the green light LG3 as described above, and reflect green light including the green light LG2 and red light, namely so as to reflect yellow light. It should be noted that it is sufficient for the second dielectric multilayer film in the first embodiment to be configured so as to reflect the green light LG2 entering the second dielectric multilayer film as the green light LG3, and transmit light having a wavelength of a color other than green, and the second dielectric multilayer film can be designed so as to be specialized for the green light.

The combining mirror 124 is arranged in an area where the light path of the cyan light LC1 emitted from the combining mirror 122 and the light path of the red light LR2 emitted from the pickup optical system 148 of the light source unit 115 merge with each other. The combining mirror 124 is formed to have a plate shape, and has a third reflecting surface 173. The third reflecting surface 173 is arranged so as to move from the −Z side toward the +Z side as proceeding from an end at the −X side toward the +X side, so as to form an angle of about 45° with respect to each of the X direction and the Z direction, and so as to be parallel to the Y direction.

The red light LR2 entering the third reflecting surface 173 from the −X side along the X direction is reflected by the third reflecting surface 173 toward the +Z side along the Z direction as red light LR3. For example, assuming the light intensity of the red light LR2 entering the third reflecting surface 173 as 100%, the light intensity of the red light LR3 emitted from the third reflecting surface 173 is appropriately adjusted within a range of about 50% through 95%.

The cyan light LC1 entering the combining mirror 124 from the −Z side is transmitted through the combining mirror 124, and is then emitted toward the +Z side along the Z direction as cyan light LC2. The cyan light LC2 and the red light LR3 emitted from the third reflecting surface 173 toward the +Z side along the Z direction are combined with each other when being emitted from the third reflecting surface 173, and thus, the white light (combined light) WL is generated. In other words, the combining mirror 124 combines the blue light LB4, the green light (the third light) LG3, and the red light LR3 as at least a part of the red light LR1 emitted from the third light source 147 with each other, and then emits the white light WL toward the +Z side along the Z direction.

The combining mirror 124 has, for example, a second mirror substrate not shown, a third dielectric multilayer film (not shown) forming the third reflecting surface 173. The second mirror substrate is arranged so as to form an angle of about 45° with respect to each of the X direction and the Z direction as described above, and so as to be parallel to the Y direction. The second mirror substrate is formed of a material capable of transmitting at least blue light and green light, and is formed of, for example, optical glass which transmits light in the visible wavelength band similarly to the first mirror substrate. The third dielectric multilayer film is stacked on a plate surface of the second mirror substrate facing to the light source unit 115. The third dielectric multilayer film is designed taking a peak wavelength and so on of the red light LR2 into consideration so as to reflect the red light LR2 entering the third dielectric multilayer film as the red light LR3 as described above, and transmits light having a wavelength of a color other than red.

The reflecting mirror 131 is disposed on the light path of the blue light LB3 reflected by the first reflecting surface 171 of the combining mirror 122, and is arranged at the +X side of the combining mirror 122 in the X direction, and is arranged in an area where the reflecting mirror 131 overlaps the combining mirror 122 in the Y direction and the Z direction. The reflecting mirror 131 is formed to have a plate shape, and has a fourth reflecting surface 174. The fourth reflecting surface 174 is arranged in parallel to the Y-Z plane.

The blue light LB3 entering the fourth reflecting surface 174 from the −X side along the X direction is reflected by the fourth reflecting surface 174 toward the −X side along the X direction as blue light (first light) LB5. A reflection rate of the blue light in the fourth reflecting surface 174 is preferably no lower than, for example, 80%, and is appropriately adjusted. It should be noted that it is sufficient for the configuration of the reflecting mirror 131 to have the fourth reflecting surface 174 so as to be able to reflect the blue light LB3 as described above, and the configuration of the reflecting mirror 131 is not particularly limited. As the reflecting mirror 131, there is used, for example, a total reflection mirror for blue light, or a total reflection mirror for light in the visible wavelength band.

In the light source device 100A in which the constituents described above are arranged, at least a part of the blue light LB2 having been emitted from the light source unit 111 is branched by the combining mirror 122 into the blue light LB3 and the blue light LB4. The blue light LB5 reflected by the reflecting mirror 131 is transmitted through the combining mirror 122, and is emitted from the second reflecting surface 172 toward the −X side along the X direction as blue light LB6. The blue light LB6 passes through the pickup optical system 144, and is then emitted as blue light LB7, and enters the wavelength conversion element 146 of the light source unit 113 while condensing from the +X side. A beam diameter of the blue light LB7 on the second surface 146a of the wavelength conversion element 146 is contracted by the pickup optical system 144 to be smaller than the beam diameter of the blue light LB6.

As shown in FIG. 3, in the light source unit 113, the first surface 146b is irradiated with the blue light LB11 emitted from the second light source 145 from the −X side, and the blue light LB enters the wavelength conversion element 146. In addition, the second surface 146a is irradiated with the blue light LB7, which has been emitted from the pickup optical system 144 toward the −X side along the X direction while condensing, from the +X side, and the blue light LB7 enters the wavelength conversion element 146. In other words, the blue light LB7 is the excitation light which is derived from the first light source 141, and reaches the second surface 146a passing through the path going through the combining mirror 122. The blue light LB11 is the original excitation light derived from the second light source 145 which constitutes the wavelength converter 143 together with the wavelength conversion element 146. The wavelength conversion element 146 is excited by the blue light LB11 and the blue light LB7 which enter the wavelength conversion element 146 from both of the first surface 146b and the second surface 146a in the X direction.

As shown in FIG. 2, the blue light LB4 transmitted through the combining mirror 122 and the green light LG2 emitted toward the +X side from the wavelength conversion element 146 of the light source unit 113 are combined with each other by the combining mirror 122, and the cyan light LC1 is then emitted toward the combining mirror 124 located at the +Z side. The cyan light LC1 entering the combining mirror 124 and the red light LR2 emitted from the light source unit 115 are combined with each other by the combining mirror 124, and the white light WL is emitted toward the +Z side along the Z direction from the combining mirror 124. In the light source device 100A, it is possible for an optical element 140 to be arranged on the light path of the white light WL as indicated by a dotted line in FIG. 2. The optical element 140 is an element for arranging a beam shape and a light intensity distribution of the white light WL emitted from the combining mirror 122 into a desired shape and a desired distribution, and then emitting the result toward the first lens array 70 of the illumination device 20 shown in FIG. 1, and can be eliminated. The optical element 140 is not particularly limited providing the optical element 140 is an element capable of arranging the beam shape and the intensity distribution of the white light WL into the desired shape and the desired distribution as described above, and can be formed of, for example, a diffuser plate or a microlens array.

It should be noted that the light intensities of the red light LR3, the green light LG3, and the blue light LB4 constituting the white light WL are appropriately set taking a color balance required for the white light WL to be emitted from the light source device 100A into consideration. Further, a reflectance and a transmittance of the first reflecting surface 171 with respect to the blue light LB2, a reflectance of the second reflecting surface 172 with respect to the green light LG2, a reflectance of the third reflecting surface 173 with respect to the red light LR2, and a reflectance of the fourth reflecting surface 174 with respect to the blue light LB3 are appropriately set taking an optimum light intensity ratio between the red light LR3, the green light LG3, and the blue light LB4 into consideration.

The light source device 100A according to the first embodiment described hereinabove is provided with at least the first light source 141, the second light source 145, the wavelength conversion element 146, the combining mirror 122, and the reflecting mirror 131. The first light source 141 emits the blue light LB1 having the blue wavelength. The second light source 145 emits the blue light LB11 for exciting the wavelength conversion element 146. The wavelength conversion element 146 has the first surface 146*b* which the blue light LB11 emitted from the second light source 145 enters, and the second surface 146*a* located at an opposite side to the first surface 146*b* in the X direction and opposed to the first surface 146*b*. The wavelength conversion element 146 converts the blue light LB11 into the green light LG1 having the green wavelength different from the blue wavelength. The combining mirror 122 combines the blue light LB4 and the green light LG3 with each other to emit the cyan light LC1. The blue light LB3 emitted from the combining mirror 122 toward the +X side along the X direction is reflected by the reflecting mirror 131 toward the −X side, namely toward the combining mirror 122. The blue light LB5 reflected by the reflecting mirror 131 enters the second surface 146*a* of the wavelength conversion element 146 via the combining mirror 122, and is converted into the green light LG1.

In the light source device 100A according to the first embodiment, the blue light LB7 as a part of the blue light LB1 emitted from the first light source 141 is used for the excitation of the wavelength conversion element 146, and thus, the green light LG1 is generated. According to the light source device 100A related to the first embodiment, out of the blue light B, the green light G, and the red light R constituting the white light WL, the green light G which is emitted from the phosphor, and is apt to be insufficient in light intensity compared to the blue light and the red light directly emitted from the solid-state light source such as an LD or an LED can be supplemented by applying a part of the blue light redundant in light intensity to the excitation of the wavelength conversion element 146 for generating the green light G. Specifically, it is possible to make the blue light LB7 as a surplus of the blue light LB1 directly emitted from the first light source 141 enter the second surface 146*a* at the opposite side to the first surface 146*b* which the blue light LB11 as the original excitation light enters in the wavelength conversion element 146 to thereby excite the wavelength conversion element 146 from the both surfaces in the X direction without excessively increasing the size of the wavelength conversion element 146 on the Y-Z plane compared to the size of the light emitting area of the first light source 141. As a result, it is possible to increase the light output from the light source device 100A and the efficiency of the light source device 100A without significantly changing the balance between R, G, and B in the white light WL.

In the light source device 100A according to the first embodiment, the optical system for combining the blue light and the green light with each other to form the cyan light is configured only by adding the reflecting mirror 131 to the optical system consisting of the light source unit 111 for emitting the blue light LB2, the light source unit 113 for emitting the green light LG2, and the combining mirror 122. Therefore, it is possible to suppress the influence on the cost and the overall size of the light source device 100A to a minor influence.

Further, in the light source device 100A according to the first embodiment, since the wavelength conversion element 146 is irradiated with the blue light LB11 and the blue light LB7 from both of the first surface 146*b* and the second surface 146*a* as described above, the efficiency of the wavelength conversion element 146 increases without making the second surface 146*a* of the wavelength conversion element 146 and the beam diameter S3 of the green light LG1 excessively larger compared to the light emitting area of the first light source 141 and the beam diameter S1 of the blue light LB1. The smaller the beam diameter S3 of the green light LG1 becomes, the more the light intensity of the green light LG1 which the pickup optical system 144 can take increases, and at the same time, the more the growth in size of the pickup optical system 144 is suppressed. In other words, it is possible to increase the conversion efficiency in the wavelength conversion element 146 to increase the light intensity of the green light LG2, and at the same time, suppress the size of the light source unit 113 to a comparable level to the light source unit 111. According to the light source device 100A related to the first embodiment, it is possible to achieve reduction in size of the whole device while realizing a good balance between the blue light, the green light, and the red light not inferior to that in the related-art light source device.

Further, in the light source device 100A according to the first embodiment, the combining mirror 122 transmits at least a part of the blue light LB2 entering the combining mirror 122 as the blue light LB4, and at the same time, reflects at least a part of the green light LG2 entering the combining mirror 122 as the green light LG3 to generate the cyan light LC1 as the combined light of the blue light LB4 and the green light LG3. The combining mirror 122 reflects another part of the blue light LB2 entering the combining mirror 122 to the reflecting mirror 131 as the blue light LB3.

In the light source device 100A according to the first embodiment, a part of the blue light LB2 by the first light source 141 is reflected by the first reflecting surface 171 of the combining mirror 122 as the blue light LB3, the blue light LB6 transmitted through the combining mirror 122 out of the blue light LB5 reflected by the reflecting mirror 131 is condensed by the pickup optical system 144, and the second surface 146*a* of the wavelength conversion element 146 is irradiated with the light thus condensed as the blue light LB7. According to the light source device 100A related to the first embodiment, it is possible to branch the blue light LB2 into the blue light LB3 with which the wavelength conversion element 146 is irradiated to excite the wavelength conversion element 146, and the blue light LB4 for combining the cyan light LC1 using the single combining mirror 122. Further, using the single combining mirror 122, it is possible to transmit the blue light LB3 toward the wavelength conversion element 146 as the blue light LB6, LB7, and merge the green light LG2 emitted from the wavelength conversion element 146 along the X direction parallel to the light paths of the blue light LB6, LB7 with the light path of the blue light LB4 to generate the cyan light LC1. Due to the above, it is possible to suppress the growth in size of the light source device 100A according to the first embodiment.

In the light source device 100A according to the first embodiment, the combining mirror 122 is arranged between the wavelength conversion element 146 of the wavelength converter 143 and the reflecting mirror 131 in the X direction (the first direction). In the X direction, the wavelength conversion element 146 is arranged at the −X side of the combining mirror 122, and the reflecting mirror 131 is arrange at the +X side of the combining mirror 122. The first light source 141 is arranged at a distance from the combining mirror 122 in the Z direction (the second direction) perpendicular to the X direction, and is arranged at the −Z side of the combining mirror 122. The second surface 146a of the wavelength conversion element 146 is arranged at a side facing to the reflecting mirror 131 in the wavelength conversion element 146 in the X direction, namely at the +X side of the wavelength conversion element 146. The second light source 145 of the wavelength converter 143 is arranged at an opposite side to a side at which the wavelength conversion element 146 faces to the reflecting mirror 131 in the X direction, namely at the −X side of the wavelength conversion element 146. The second light source 145 overlaps the wavelength conversion element 146, the reflecting mirror 131, and the combining mirror 122 in the Z direction.

In the light source device 100A according to the first embodiment, in the arrangement of the constituents described above, the second surface 146a of the wavelength conversion element 146 and the fourth reflecting surface 174 of the reflecting mirror 131 are arranged in parallel to the Y-Z plane. The first reflecting surface 171 of the combining mirror 122 is arranged so as to face to the first light source 141 and the reflecting mirror 131. The second reflecting surface 172 of the combining mirror 122 is arranged so as to face to the wavelength conversion element 146 and an exit part of the white light WL. The first reflecting surface 171 and the second reflecting surface 172 move from the −X side toward the +X side as proceeding from the −Z side toward the +Z side. Due to the arrangement configuration described above, the light paths of the blue light LB5 through LB7 as a part of the blue light LB1 emitted from the first light source 141, the light paths of the blue light LB11, LB7 for exciting the wavelength conversion element 146, and the light paths of the green light LG1, LG2 obtained by the wavelength conversion can be made overlap each other along the X direction. This makes it possible to achieve an increase in efficiency of the wavelength conversion by applying the blue light LB7 as a surplus of the blue light LB1 for combining the white light WL to the excitation of the wavelength conversion element 146 while suppressing the growth in size of the light source device 100A according to the first embodiment and the total number of the optical elements and the optical members.

In the light source device 100A according to the first embodiment, the first surface 146b of the wavelength conversion element 146 and the exit surface (the exit surface where the second light is emitted from the second light source) 161e of the light emitting element 161 of the second light source 145 have contact with each other. According to the light source device 100A related to the first embodiment, it is possible to make the blue light LB11 emitted from the exit surface 161e of the light emitting element 161 of the second light source 145 efficiently enter the wavelength conversion element 146 from the first surface 146b. This makes it unnecessary to apply an excessive burden on the blue light LB7 to be applied for ensuring the wavelength conversion efficiency of the wavelength conversion element 146, and thus, the freedom in setting the reflectance of the first reflecting surface 171 and the second reflecting surface 172 of the combining mirror 122 increases.

The projector 15 according to the first embodiment is provided with the light source device 100A described above, the light modulation devices 400R, 400G, and 400B for modulating the light from the light source device 100A in accordance with the image information to thereby form the image light, and the projection optical system 600 for projecting the image light. According to the projector 15 related to the first embodiment, since the light source device 100A is provided, it is possible to obtain the good color balance in the white light WL to increase brightness and chromaticity of the image to be projected on the screen SCR, and at the same time, achieve the reduction in size.

Second Embodiment

Then, a second embodiment of the present disclosure will be described using FIG. 4.

It should be noted that in each of the second embodiment and the subsequent embodiments, constituents common to the precedent embodiments are denoted by the same reference symbols, and the description thereof will be omitted. In each of the second embodiment and the subsequent embodiments, configurations and contents different from those of the precedent embodiments will mainly be described.

Further, unless particularly described, the configuration of the projector except the light source device according to each of the second embodiment and subsequent embodiments is common to the configuration of the projector 15 according to the first embodiment.

Figure 4:
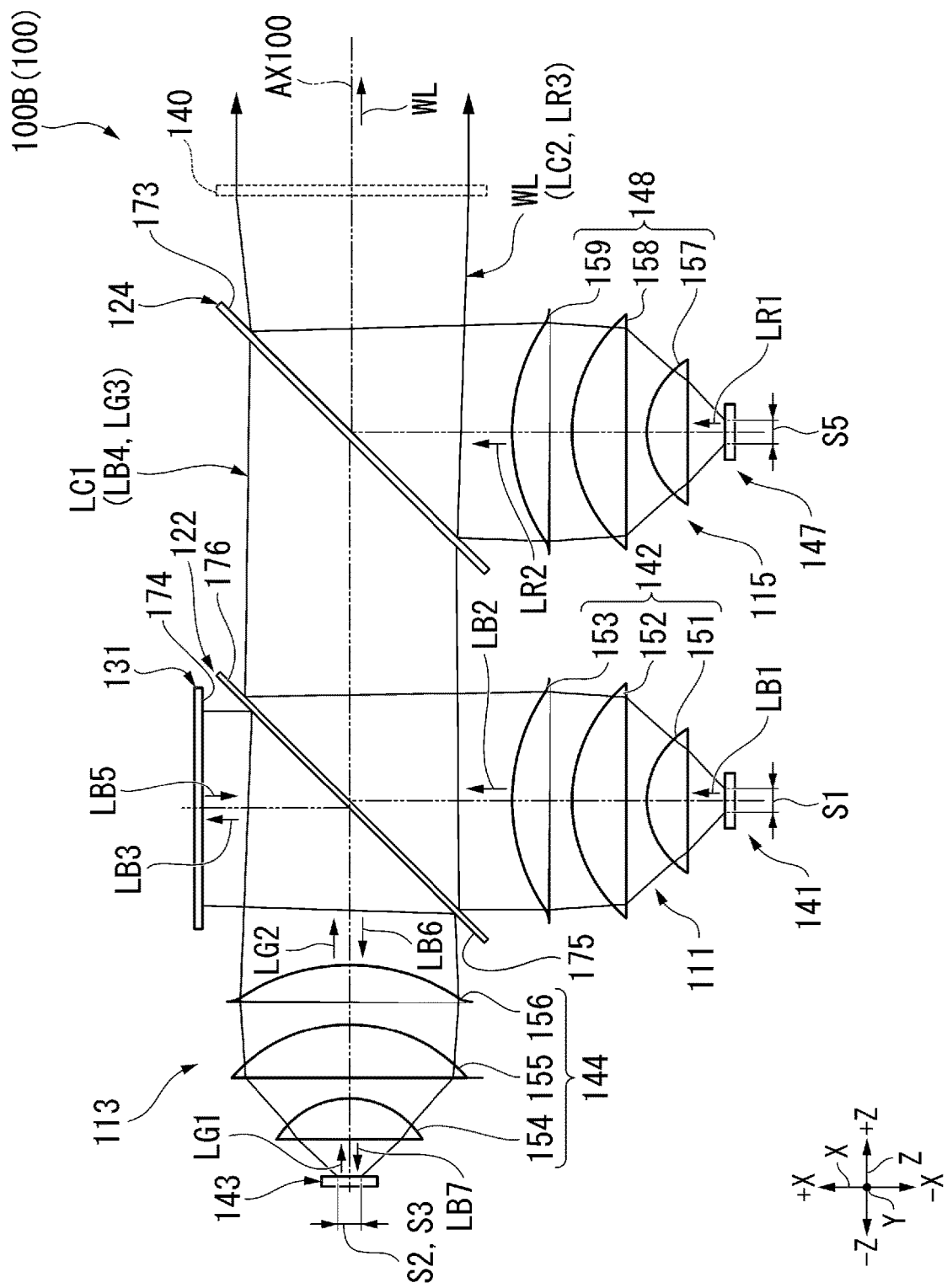
FIG. 4 is a configuration diagram of a light source device according to a second embodiment.

FIG. 4 is a configuration diagram of a light source device 100B according to the second embodiment. As shown in FIG. 4, the light source device 100B is provided with the light source units 111, 113, and 115, the combining mirrors 122, 124, and the reflecting mirror 131 similarly to the light source device 100A described in the first embodiment. It should be noted that in the light source device 100B, the arrangement of the light source unit 111 and the arrangement of the light source unit 113 are exchanged for each other compared to the arrangement in the light source device 100A.

Specifically, the light source unit 111 is arranged at the −Z side of at least the first lens array 70 described with reference to FIG. 1 in the Z direction, and is arranged at the −Z side of the light source unit 115, and overlaps the combining mirror 122 and the reflecting mirror 131. The first light source 141 of the light source unit 111 emits the blue light LB1 toward the +X side along the X direction. The pickup optical system 142 emits the blue light LB2 toward the +X side along the X direction.

The light source unit 113 is arranged on the optical axis AX100, and is arranged at the −Z side of the light source unit 111, the combining mirror 122, and the reflecting mirror 131 in the Z direction. The light source unit 113 overlaps the combining mirrors 122, 124 in the X direction. The second light source 145 of the wavelength converter 143 emits the blue light LB11 toward the +Z side in the Z direction. The wavelength conversion element 146 of the wavelength converter 143 is arranged at the +Z side of the second light source 145. The first surface 146b and the second surface 146a of the wavelength conversion element 146 are arranged in parallel to the X-Y plane including the X direction and the Y direction. The second surface 146a of the wavelength conversion element 146 is arranged at the +Z side of the first surface 146b.

As described later, the second surface 146a is irradiated with the blue light LB7 as a part (at least a part) of the blue light LB1 emitted from the first light source 141 from the +Z side along the Z direction, and the blue light LB7 enters the wavelength conversion element 146 from the second surface 146a. The wavelength conversion element 146 generates the green light LG1 using the blue light LB7, LB11 entering the wavelength conversion element 146 as the excitation light to thereby perform the wavelength conversion on the blue light LB7, LB11 into the green light LG1.

The combining mirror (the optical member) 122 has a fifth reflecting surface 175 and a sixth reflecting surface 176 instead of the first reflecting surface 171 and the second reflecting surface 172. The fifth reflecting surface 175 and the sixth reflecting surface 176 are arranged so as to move from the −Z side toward the +Z side as proceeding from an end at the −X side toward the +X side, so as to form an angle of about 45° with respect to each of the X direction and the Z direction, and so as to be parallel to the Y direction. By the fifth reflecting surface 175, at least a part of the blue light LB2 which is transmitted through the sixth reflecting surface 176 along the X direction as described later and then enters the fifth reflecting surface 175 from the −X side is transmitted as the blue light LB3, and at least a part of the blue light LB5 entering the fifth reflecting surface 175 from the +X side is reflected toward the −Z side along the Z direction as the blue light LB6. The fifth reflecting surface 175 transmits the green light LG2 entering the fifth reflecting surface 175 from the −Z side along the Z direction. By the sixth reflecting surface 176, at least a part of the blue light LB2 entering the sixth reflecting surface 176 from the −X side along the X direction is transmitted, and at least a part (another part) of the rest of the blue light LB2 is reflected toward the +Z side along the Z direction as the blue light LB4.

The combining mirror 122 has, for example, the first mirror substrate not shown, a fifth dielectric multilayer film (not shown) forming the fifth reflecting surface 175, and a sixth dielectric multilayer film forming the sixth reflecting surface 176. The fifth dielectric multilayer film is stacked on a plate surface of the first mirror substrate facing to the light source unit 113 using a manufacturing method such as evaporation coating. The fifth dielectric multilayer film is designed taking a peak wavelength and so on of the blue light LB2 into consideration so as to transmit at least a part of the blue light LB2 entering the fifth dielectric multilayer film as the blue light LB3, and at the same time, so as to reflect at least a part of the blue light LB5 entering the fifth dielectric multilayer film toward the −Z side along the Z direction as described above. The sixth dielectric multilayer film is stacked on a plate surface of the first mirror substrate facing to the light source unit 111 using a manufacturing method such as evaporation coating. The sixth dielectric multilayer film is designed taking a peak wavelength and so on of the blue light LB2 into consideration so as to transmit at least a part of the blue light LB2 entering the sixth dielectric multilayer film, and at the same time, so as to reflect at least a part of the rest of the blue light LB2 toward the +Z side along the Z direction as described above. The fifth dielectric multilayer film and the sixth dielectric multilayer film are designed taking the peak wavelength and so on of the green light LG2 into consideration so as to transmit the light having a wavelength of a color other than blue.

In the light source device 100B in which the constituents described above are arranged, at least a part of the blue light LB2 having been emitted from the light source unit 111 is branched by the combining mirror 122 into the blue light LB3 and the blue light LB4. The blue light LB5 emitted from the reflecting mirror 131 is reflected by the combining mirror 122, and is emitted from the fifth reflecting surface 175 toward the −Z side along the Z direction as blue light LB6. The blue light LB6 passes through the pickup optical system 144, and is then emitted as the blue light LB7, and enters the wavelength conversion element 146 of the light source unit 113 from the +Z side. The wavelength conversion element 146 is excited by the blue light LB11, LB7 entering the wavelength conversion element 146 from the first surface 146b and the second surface 146a, and emits the green light LG1 from the second surface 146a toward the +Z side along the Z direction.

The blue light LB4 reflected by the combining mirror 122, and the green light LG3 which is emitted from the wavelength conversion element 146 of the light source unit 113 toward the +Z side, and is then transmitted through the fifth reflecting surface 175 of the combining mirror 122 are combined with each other on the sixth reflecting surface 176 of the combining mirror 122. The cyan light LC1 is emitted from the sixth reflecting surface 176 of the combining mirror 122 toward the combining mirror 124 at the +Z side. Similarly to the first embodiment, the combining mirror 124 combines the cyan light LC1 entering the combining mirror 124 and the red light LR2 emitted from the light source unit 115 with each other to emit the white light WL thus generated toward the +Z side along the Z direction.

It should be noted that a reflectance of the fifth reflecting surface 175 with respect to the blue light LB5, a transmittance of the fifth reflecting surface 175 with respect to the blue light LB2, a reflectance of the sixth reflecting surface 176 with respect to the blue light LB2, a reflectance of the third reflecting surface 173 with respect to the red light LR2, and a reflectance of the fourth reflecting surface 174 with respect to the blue light LB3 are appropriately set taking an optimum light intensity ratio between the red light LR3, the green light LG3, and the blue light LB4 into consideration.

In the light source device 100B according to the second embodiment described hereinabove, the blue light LB7 as a part of the blue light LB1 emitted from the first light source 141 is used for the excitation of the wavelength conversion element 146, and thus, the green light LG1 is generated similarly to the light source device 100A according to the first embodiment. Therefore, according to the light source device 100B related to the second embodiment, out of the blue light, the green light, and the red light constituting the white light WL, the green light which is apt to be insufficient in light intensity compared to the blue light and the red light can be supplemented with a part of the blue light redundant in light intensity. As a result, it is possible to increase the light output from the light source device 100B without significantly changing the balance between R, G, and B in the white light WL.

Further, in the light source device 100B according to the second embodiment, the combining mirror 122 reflects the blue light LB4 as at least a part of the blue light LB2 entering the combining mirror 122, and at the same time, transmits at least a part of the green light LG2 entering the combining mirror 122 as the green light LG3 to generate the cyan light LC1 as the combined light of the blue light LB4 and the green light LG3. The combining mirror 122 transmits another part of the blue light LB2 entering the combining mirror 122 toward the reflecting mirror 131.

In the light source device 100B according to the second embodiment, a part of the blue light LB2 by the first light source 141 is transmitted through the sixth reflecting surface 176 and the fifth reflecting surface 175 of the combining mirror 122 as the blue light LB3, the blue light LB6 to be reflected by the fifth reflecting surface 175 of the combining mirror 122 out of the blue light LB5 reflected by the reflecting mirror 131 is condensed by the pickup optical system 144, and the second surface 146a of the wavelength conversion element 146 is irradiated with the light thus condensed as the blue light LB7.

According to the light source device 100B related to the second embodiment, the blue light LB2 is branched into the blue light LB3 with which the wavelength conversion element 146 is irradiated to excite the wavelength conversion element 146, and the blue light LB4 for combining the cyan light LC1 using the single combining mirror 122. Further, using the single combining mirror 122, it is possible to reflect the blue light LB3 toward the wavelength conversion element 146 as the blue light LB6, LB7, and at the same time, merge the green light LG2 emitted from the wavelength conversion element 146 along the Z direction parallel to the light paths of the blue light LB6, LB7 with the light path of the blue light LB4 to generate the cyan light LC1. As a result, it is possible to suppress the growth in size of the light source device 100B according to the second embodiment.

Further, according to the light source device 100B related to the second embodiment, similarly to the first embodiment, since the blue light LB6 made to enter the second surface 146a of the wavelength conversion element 146 is branched from the blue light LB2 emitted from the light source unit 111 using the combining mirror 122 and the reflecting mirror 131 without using a lens, and then the light source unit 113 is irradiated with the blue light LB6, it is possible to prevent a spherical aberration in the blue light LB6 from occurring.

Although not shown in the drawings, the projector according to the second embodiment is provided with the light source device 100B described above instead of the light source device 100A as the light source device 100 of the projector 15 according to the first embodiment. According to the projector related to the second embodiment, it is possible to increase the brightness and the chromaticity of the image to be projected on the screen SCR, and at the same time, achieve the reduction in size.

Third Embodiment

Then, a third embodiment of the present disclosure will be described using FIG. 5.

Figure 5:
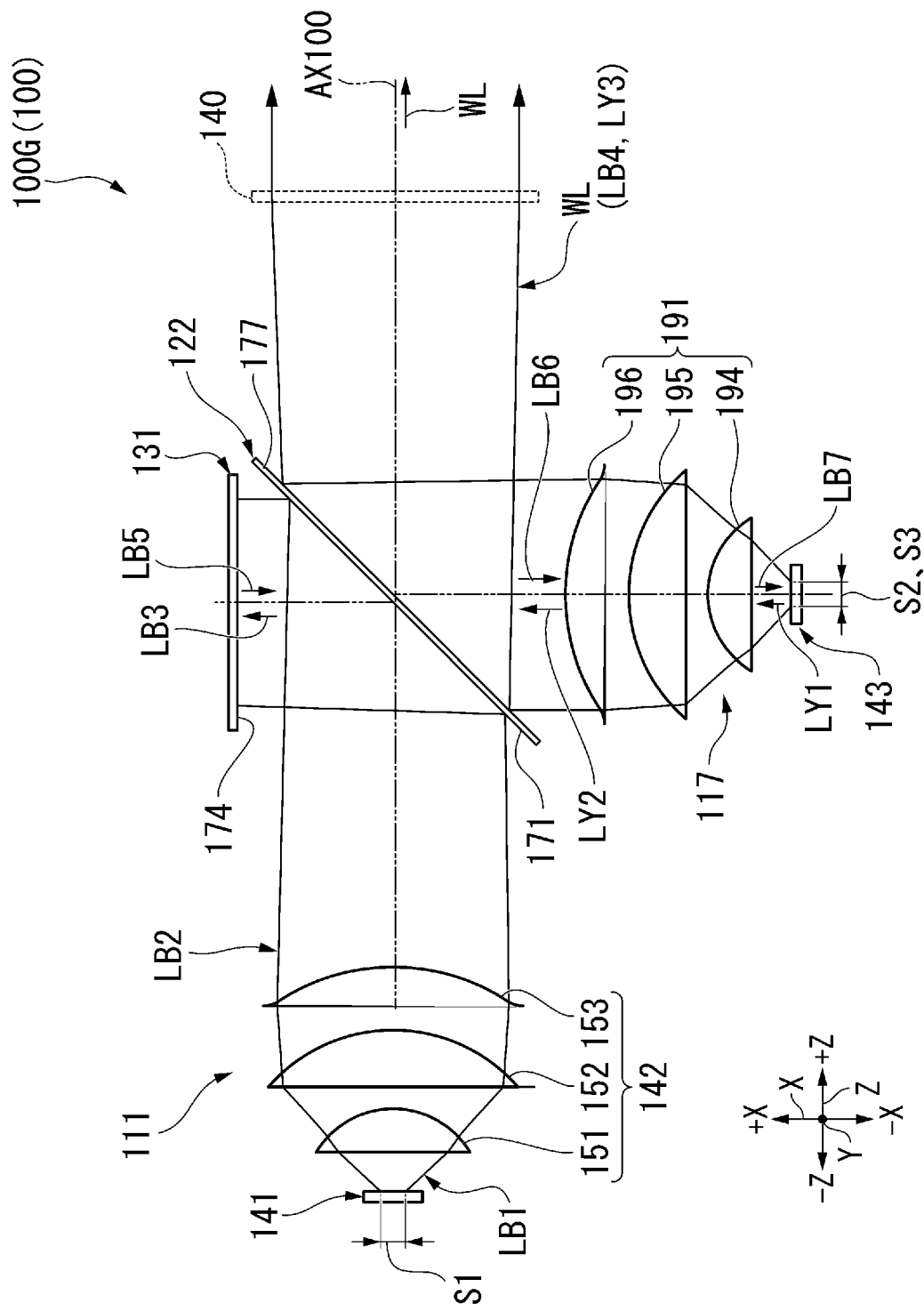
FIG. 5 is a configuration diagram of a light source device according to a third embodiment.

FIG. 5 is a configuration diagram of a light source device 100G according to the third embodiment. As shown in FIG. 5, the light source device 100G according to the third embodiment is provided with the light source units 111, 117, the combining mirror 122, and the reflecting mirror 131 similarly to the light source device 100A according to the first embodiment.

The light source device 100G is a device in which the light source unit 117 is arranged instead of the light source unit 113 in the light source device 100A shown in FIG. 2, and is not required to be provided with the light source unit 115 or the combining mirror 124. The light source unit 117 is provided with a wavelength converter 181 and a pickup optical system 191. The wavelength converter 181 emits yellow light (third light) LY1.

Figure 6:
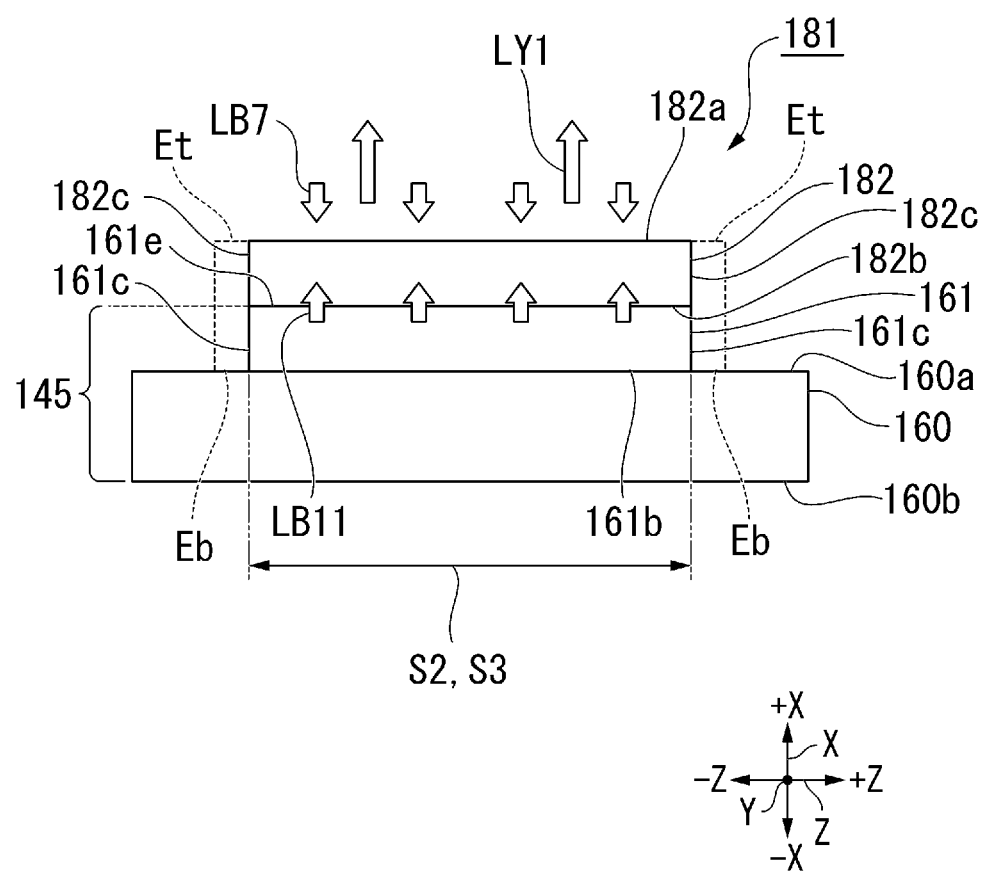
FIG. 6 is a diagram showing configuration of a wavelength converter of the light source device shown in FIG. 5.

FIG. 6 is a diagram showing a configuration when viewing the wavelength converter 181 along the Y direction. As shown in FIG. 6, the wavelength converter 181 is provided with the second light source 145 for emitting the blue light (second light) LB11, and a wavelength conversion element 182 for converting the blue light entering the wavelength conversion element 182 including the blue light LB11 into the yellow light LY1. The peak wavelength of the blue light LB11 emitted by the light emitting element 161 of the second light source 145 is within a range of, for example, 440 nm through 480 nm similarly to, for example, the blue light LB1, but is sufficiently a wavelength capable of exciting the wavelength conversion element 182 so that the yellow light LY1 is emitted from the wavelength conversion element 182, and is not limited to a specific value.

The wavelength conversion element 182 is stacked on the exit surface 161e of the light emitting element 161 of the second light source 145. The wavelength conversion element 182 has a first surface 182b at the −X side and a second surface 182a at the +X side parallel to the Y-Z plane. It is preferable for the first surface 182b of the wavelength conversion element 182 to have contact with the exit surface 161e of the light emitting element 161. The illustrative example between the light emitting element 161 and the wavelength conversion element 182 can be considered by replacing the wavelength conversion element 146 with the wavelength conversion element 182 in the illustrative example and the modified example between the light emitting element 161 and the wavelength conversion element 146 described in the first embodiment. It is preferable for an air layer and a layer which causes a loss of the blue light LB11 not to intervene between the first surface 182b of the wavelength conversion element 182 and the exit surface 161e of the light emitting element 161.

The blue light LB7 as a part (at least a part) of the blue light LB1 emitted from the first light source 141 enters the wavelength conversion element 182 from the second surface 182a. The wavelength conversion element 182 generates the yellow light LY1 as the fluorescence using the blue light LB7, LB11 entering the wavelength conversion element 182 as the excitation light to thereby perform the wavelength conversion on the blue light LB7, LB11 into the yellow light LY1. The yellow light LY1 has a yellow wavelength (a second wavelength) including the green wavelength and the red wavelength. The yellow wavelength is included in a range of, for example, 570 nm through 630 nm, but is sufficiently a wavelength belonging to a yellow color in the visible wavelength band, and is not limited to a specific value.

A material of the wavelength conversion element 182 includes, for example, an yttrium aluminum garnet (YAG) type phosphor. Citing YAG:Ce including cerium (Ce) as an activator agent as an example, as the material of the wavelength conversion element 182, there can be cited a material obtained by mixing raw powder including constituent elements such as $Y_2O_3$, $Al_2O_3$ and $CeO_3$ to cause the solid-phase reaction, Y—Al—O amorphous particles obtained by a wet process such as a coprecipitation process or a sol-gel process, and YAG particles obtained by a gas-phase process such as a spray drying process, a flame heat decomposition process or a thermal plasma process. It should be noted that it is sufficient for the material of the wavelength conversion element 182 to be a material capable of performing the wavelength conversion on the blue light LB7, LB11 into the yellow light LY1 having a desired yellow wavelength, and is not limited to a specific material.

An average dimension of the light emitting area of the yellow light LY1 on the Y-Z plane in the wavelength conversion element 182, namely the beam diameter of the yellow light LY1 immediately after being emitted from the wavelength conversion element 182, is defined as S3, the beam diameter S3 of the yellow light LY1 is preferably no larger than twice of the beam diameter S1 of the blue light LB1, and is more preferably equivalent to the beam diameter S1.

As shown in FIG. 5, the pickup optical system 191 is arranged between a light path of the blue light LB2 and the wavelength conversion element 182 of the light source unit 117 in the X direction, and is arranged at the +X side of the second light source 145 and the wavelength conversion element 182. The pickup optical system 191 has, for example, a first lens 194, a second lens 195, and a third lens 196. Each of the first lens 194, the second lens 195, and the third lens 196 is formed of a convex lens similarly to each of the first lens 154, the second lens 155, and the third lens 156 of the pickup optical system 142.

It should be noted that, similarly to the embodiments described above, the number, the arrangement, and the shapes of the lenses constituting the pickup optical system 191 are appropriately selected taking an installable distance and so on in the X direction of the pickup optical system 191 into consideration so as to take the yellow light LY1 emitted with the beam diameter S3 from the wavelength conversion element 182 as much as possible, and at the same time, enlarge the yellow light LY1 to have a desired beam diameter at the +X side of the pickup optical system 191. The pickup optical system 191 enlarges the yellow light LY1 entering the pickup optical system 191 from the wavelength conversion element 182 into yellow light (third light) LY2 having a beam diameter substantially equivalent to that of the blue light LB2, and then emits the yellow light LY2 toward the +X side along the X direction.

The combining mirror (an optical member) 122 is arranged in an area where the light path of the blue light LB2 and the light path of the yellow light LY2 emitted from the pickup optical system 191 of the light source unit 113 merge with each other. The combining mirror 122 is formed to have a plate shape, and has the first reflecting surface 171, and a seventh reflecting surface 177 at an opposite side to the first reflecting surface 171. The seventh reflecting surface 177 is located at the +Z side of the first reflecting surface 171. The seventh reflecting surface 177 is arranged so as to move from the −Z side toward the +Z side as proceeding from an end at the −X side toward the +X side, so as to form an angle of about 45° with respect to each of the X direction and the Z direction, and so as to be parallel to the Y direction.

The yellow light LY2 entering the seventh reflecting surface 177 from the −X side along the X direction is reflected by the seventh reflecting surface 177 toward the +Z side along the Z direction as yellow light LY3. For example, assuming the light intensity of the yellow light LY2 entering the seventh reflecting surface 177 as 100%, the light intensity of the yellow light LY3 emitted from the seventh reflecting surface 177 is appropriately adjusted within a range of about 50% through 95%.

The blue light LB4 and the yellow light LY3 emitted from the seventh reflecting surface 177 toward the +Z side along the Z direction are combined with each other when being emitted from the seventh reflecting surface 177, and thus, the white light (combined light) WL is generated. In other words, the combining mirror 122 combines the blue light (first light) LB4 as a part of the blue light LB1 and the yellow light (third light) LY3 as at least a part of the yellow light LY1 emitted from the wavelength conversion element 182 with each other, and then emits the white light WL toward the +Z side along the Z direction.

The combining mirror 122 is constituted by the constituents described in the first embodiment in substantially the same manner. It should be noted that the combining mirror 122 is provided with a seventh dielectric multilayer film (not shown) for forming the seventh surface 177 instead of the second dielectric multilayer film (not shown) forming the second reflecting surface 172. The seventh dielectric multilayer film is stacked on a plate surface facing to the light source unit 117 of the first mirror substrate using a manufacturing method such as evaporation coating, and reflects the yellow light LY2 entering the seventh dielectric multilayer film as the yellow light LY3 as described above. It should be noted that when the second dielectric multilayer film of the combining mirror 122 described in the first embodiment is designed so as not to be specialized for the green light but to reflect the yellow light including the green light LG2 as described above, the combining mirror 122 of the light source device 100G can be provided with the same configuration as that of the combining mirror 122 of the light source device 100A.

The behavior and the path of the blue light in the light source device 100G are substantially the same as those of the light source device 100A. It should be noted that in the light source device 100G, the yellow light LY2 emitted from the pickup optical system 191 of the light source unit 117 enters the seventh reflecting surface 177 of the combining mirror 122, and is reflected by the seventh reflecting surface 177 toward the +Z side along the Z direction. The blue light LB4 transmitted through the combining mirror 122 and the yellow light LY3 reflected by the seventh reflecting surface 177 of the combining mirror 122 are combined with each other when being emitted from the seventh reflecting surface 177 toward the +Z side. In other words, the white light WL is emitted from the seventh reflecting surface 177 of the combining mirror 122 toward the first lens array 70 of the illumination device 20 shown in FIG. 1. The combining mirror 122 combines the blue light LB4 as a part of the blue light LB2 entering the combining mirror 122 and the yellow light LY2 emitted from the light source unit 117 with each other, and then emits the white light WL thus generated toward the +Z side along the Z direction.

The light source device 100G according to the third embodiment described hereinabove is provided with substantially the same configuration as that of the light source device 100A according to the first embodiment, and therefore, exerts substantially the same functions and advantages as those of the light source device 100A.

In the light source device 100G according to the third embodiment, since the light source unit 117 for emitting the yellow light LY1, LY2 is provided, and the functions of the light source unit 115 and the combining mirror 124 in the light source device 100A according to the first embodiment are consolidated into the light source unit 113 and the combining mirror 122, it is possible to achieve further reduction in size compared to the light source device 100A according to the first embodiment.

Although not shown in the drawings, the projector according to the third embodiment is provided with the light source device 100G described above instead of the light source device 100A as the light source device 100 of the projector 15 according to the first embodiment. According to the projector related to the third embodiment, it is possible to increase the brightness and the chromaticity of the image to be projected on the screen SCR, and at the same time, achieve a further reduction in size compared to the projector according to the first embodiment.

Fourth Embodiment

Then, a fourth embodiment of the present disclosure will be described using FIG. 7.

Figure 7:
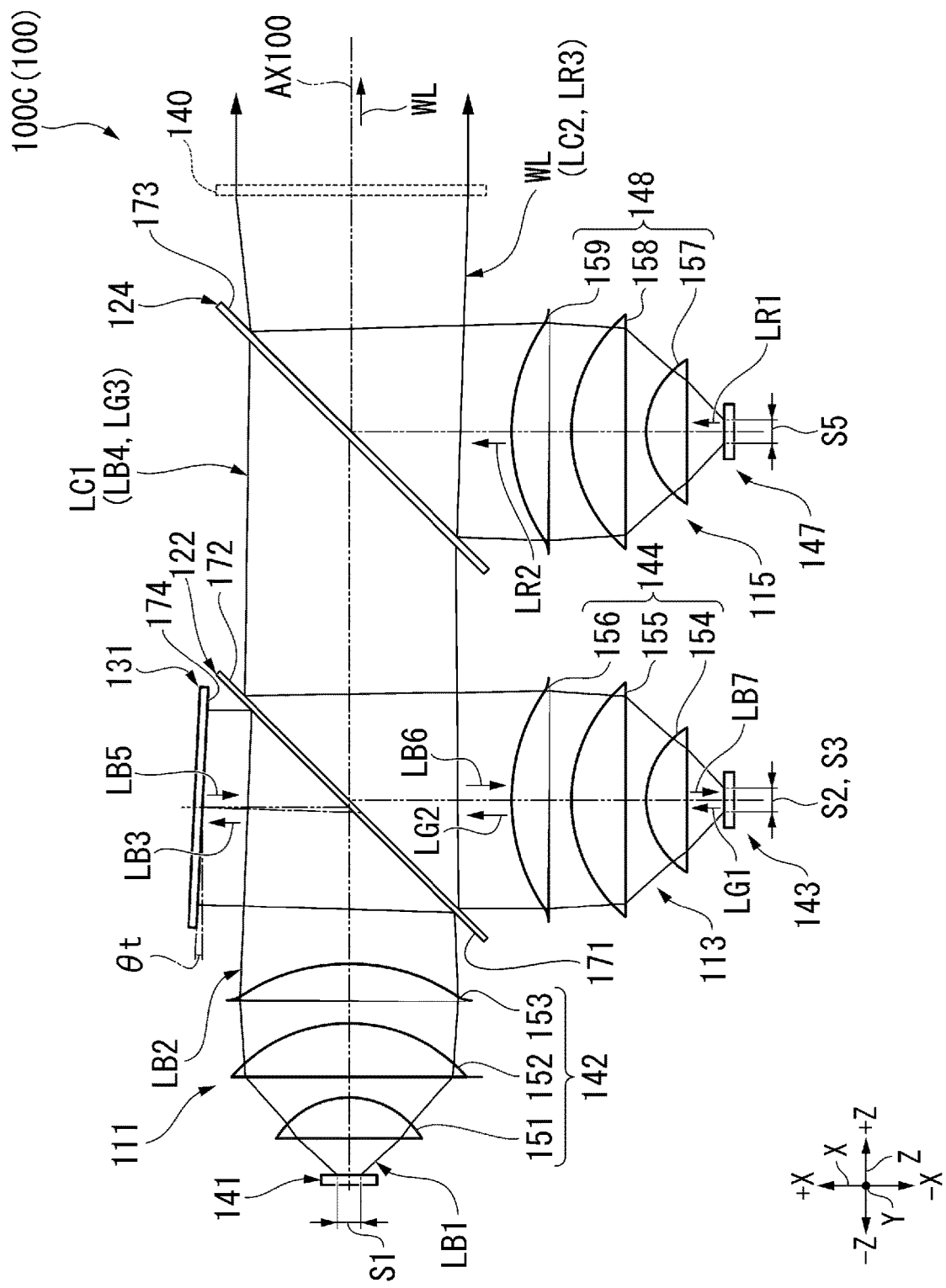
FIG. 7 is a configuration diagram of a light source device according to a fourth embodiment.

FIG. 7 is a configuration diagram of a light source device 100C according to the fourth embodiment. As shown in FIG. 7, the light source device 100C according to the fourth embodiment is provided with the light source units 111, 113, and 115, the combining mirrors 122, 124, and the reflecting mirror 131 similarly to the light source device 100A according to the first embodiment.

In the light source device 100C, the fourth reflecting surface (a reflecting surface) 174 of the reflecting mirror 131 is not parallel to the Y-Z plane, but is arranged forming an angle θt with respect to the Y-Z plane. When viewed along the Y direction, the fourth reflecting surface 174 has a planar shape, and moves from the +X side toward the −X side with a constant amount as proceeding from the −Z side toward the +Z side.

The behaviors and the paths of the blue light, the green light, and the red light in the light source device 100C are substantially the same as those of the light source device 100A. It should be noted that in the light source device 100C, since the fourth reflecting surface 174 of the reflecting mirror 131 is tilted forming the angle θt with respect to the Y-Z plane, the area where the blue light LB5 which is reflected by the reflecting mirror 131 and is then emitted from the fourth reflecting surface 174 enters the first reflecting surface 171 moves toward the −Z side of the area where the blue light LB5 enters the first reflecting surface 171 in the light source device 100A. A displacement toward the −Z side of the area where the blue light LB5 enters the first reflecting surface 171 changes in accordance with the angle θt and the distance in the Z direction between the fourth reflecting surface 174 and the first reflecting surface 171.

The light source device 100C and the projector according to the fourth embodiment described hereinabove are provided with substantially the same configurations as those of the light source device 100A and the projector according to the first embodiment, and therefore, exert substantially the same functions and advantages as those of the light source device 100A and the projector.

Further, in the light source device 100C according to the fourth embodiment, the reflecting mirror 131 has the fourth reflecting surface 174 for reflecting the blue light (first light) LB3 toward the combining mirror 122, wherein the blue light LB3 is reflected by the combining mirror 122, and is then emitted from the first reflecting surface 171 toward the +X side along the X direction. The fourth reflecting surface 174 is tilted with respect to the Y-Z plane (a plane perpendicular to a light axis of the first light) perpendicular to the light axis of the blue light LB3 entering the fourth reflecting surface 174.

In the light source devices 100A, 100C, the blue light LB5 which is reflected on the reflecting mirror 131 and is emitted toward the −X side is refracted by the first reflecting surface 171 of the combining mirror 122, and moves toward the +Z side while proceeding toward the −X side. The displacement of the blue light LB5 in the Z direction is decided by the refraction angle on the first reflecting surface 171, and varies in accordance with a refractive index difference between the air and the first mirror substrate of the combining mirror 122. The blue light LB5 is refracted once again on the second reflecting surface 172, and is then emitted toward the −X side. By the blue light LB5 being refracted by the combining mirror 122 in such a manner, the centroid of the condensing spot of the blue light LB7 on the second surface 146a of the wavelength conversion element 146 is slightly shifted toward the −Z side from an intersection point between the light axis of the blue light LB5 and the first reflecting surface 171.

In the light source device 100C according to the fourth embodiment, since the fourth reflecting surface 174 is tilted forming the angle θt with respect to the Y-Z plane as described above, the centroid of the condensing spot of the blue light LB7 is shifted in the Z direction compared to the light source device 100A according to the first embodiment in which the fourth reflecting surface is parallel to the Y-Z plane, and thus, a illuminance deviation of the condensing spot of the blue light LB7 changes. According to the light source device 100C related to the fourth embodiment, by adjusting a degree of the tilt of the fourth reflecting surface 174 with respect to the Y-Z plane, namely the angle θt, it is possible to adjust the position in the Z direction of the centroid of the condensing spot of the blue light LB7 on the second surface 146a of the wavelength conversion element 146 to thereby adjust the illuminance deviation of the blue light LB7 entering the wavelength conversion element 146. Further, in the light source device 100C according to the fourth embodiment, by tilting the fourth reflecting surface 174 of the reflecting mirror 131 as described above, it is possible to reduce the spherical aberration and the misalignment between the light path and the light axis of the blue light LB6 and the light path and the light axis of the green light LG2 in the thickness direction of the first mirror substrate and the dielectric multilayer film of the combining mirror 122.

The angle θt is set in accordance with the sizes in the Y direction and the Z direction of the second surface 146a of the wavelength conversion element 146, a moving distance or an adjusting distance on the second surface 146a of the centroid of the condensing spot of the blue light LB7, an amount of the adjustment of the illuminance deviation of the condensing spot of the blue light LB7, and a separation distance between the fourth reflecting surface 174 and the second surface 146a of the wavelength conversion element 146 in the X direction.

It should be noted that taking the shape or the like on the Y-Z plane of the wavelength conversion element 146 into consideration, it is possible for the fourth reflecting surface 174 to be tilted forming the angle θt with respect to the Y-Z plane, and move from the +X side toward the −X side, or from the −X side toward the +X side, when moving along the Y direction. On that occasion, by adjusting the angle θt, it is possible to adjust the illuminance deviation and the position in the Y direction of the centroid of the condensing spot of the blue light LB7 on the second surface 146a of the wavelength conversion element 146 to thereby achieve the optimization of the illuminance distribution of the blue light LB7 on the second surface 146a.

It should be noted that in each of the light source device 100b according to the second embodiment and the light source device 100G according to the third embodiment, it is possible to apply the configuration of the light source device 100C according to the fourth embodiment, and thus, it is possible for the fourth reflecting surface 174 of the reflecting mirror 131 to be arranged so as to be tilted with respect to the Y-Z plane. According also to such a configuration, substantially the same functions and advantages as those of the light source device 100C according to the fourth embodiment can be obtained.

Fifth Embodiment

Then, a fifth embodiment of the present disclosure will be described using FIG. 8.

Figure 8:
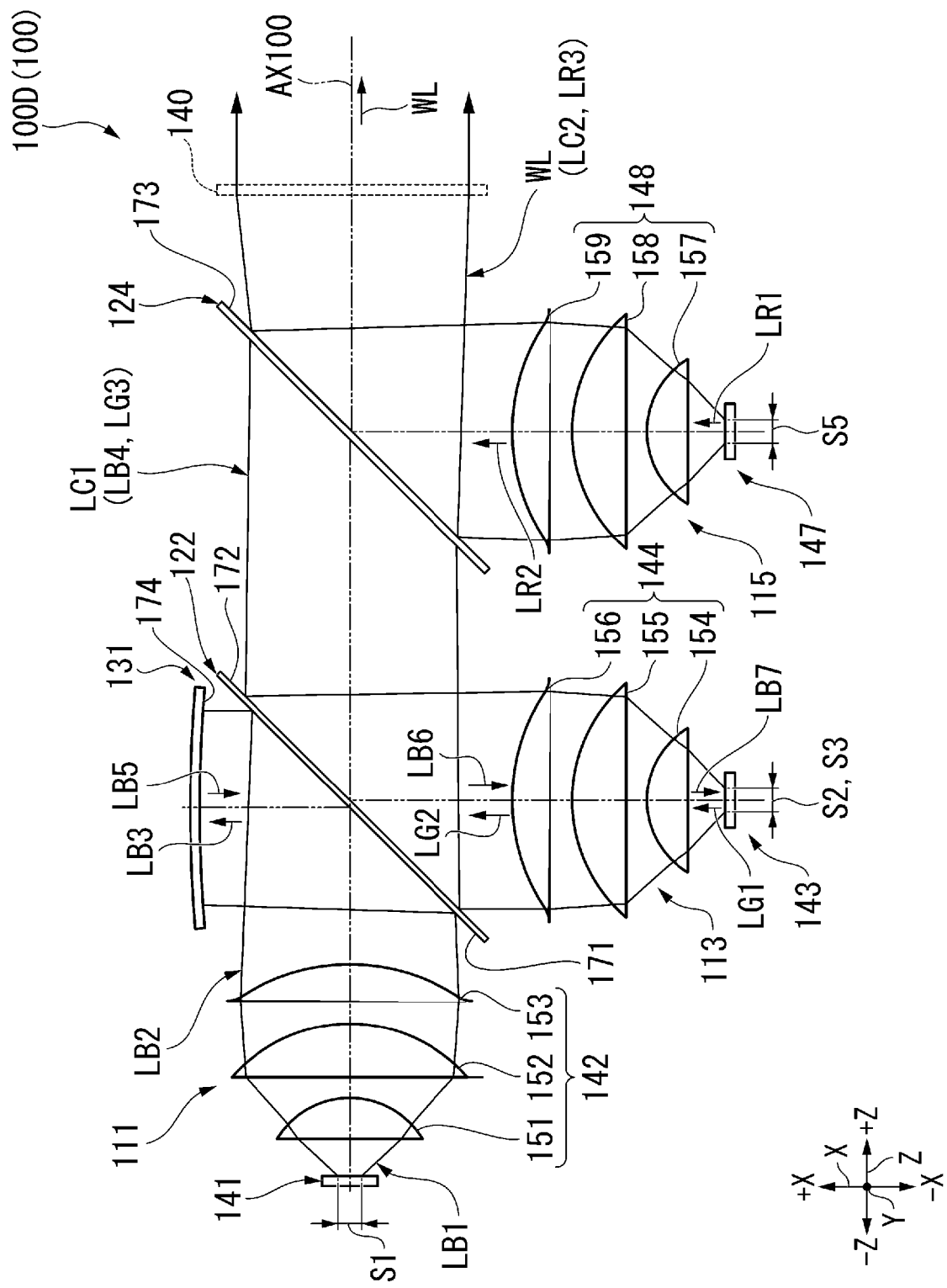
FIG. 8 is a configuration diagram of a light source device according to a fifth embodiment.

FIG. 8 is a configuration diagram of a light source device 100D according to the fifth embodiment. As shown in FIG. 8, the light source device 100D according to the fifth embodiment is provided with the light source units 111, 113, and 115, the combining mirrors 122, 124, and the reflecting mirror 131 similarly to the light source device 100A according to the first embodiment.

In the light source device 100D, the fourth reflecting surface (a reflecting surface) 174 of the reflecting mirror 131 is not parallel to the Y-Z plane, but is curved with a predetermined curvature radius with respect to the Y-Z plane. When viewed along the Y direction, the fourth reflecting surface 174 moves in a curve from the −X side toward the +X side, and then moves in a curve from the +X side toward the −X side as proceeding from the −Z side toward the +Z side. A peak at the +X side of the fourth reflecting surface 174 substantially overlaps the light axis of the blue light LB3 entering the fourth reflecting surface 174.

The behaviors and the paths of the blue light, the green light, and the red light in the light source device 100D are substantially the same as those of the light source device 100A. It should be noted that in the light source device 100D, since the fourth reflecting surface 174 of the reflecting mirror 131 is formed to have a convex curve shape protruding toward the +X side, the condensing spot of the blue light LB7 to be condensed on the second surface 146a of the wavelength conversion element 146 is defocused toward the +X side in the X direction. An amount of the defocus of the condensing spot of the blue light LB7 varies in accordance with the curvature radius of the fourth reflecting surface 174, and the separation distance in the Z direction between the fourth reflecting surface 174 and the first reflecting surface 171.

The light source device 100D and the projector according to the fifth embodiment described hereinabove are provided with substantially the same configurations as those of the light source device 100A and the projector according to the first embodiment, and therefore, exert substantially the same functions and advantages as those of the light source device 100A and the projector.

Further, in the light source device 100D according to the fifth embodiment, the reflecting mirror 131 has the fourth reflecting surface 174 for reflecting the blue light (first light) LB3 toward the combining mirror 122, wherein the blue light LB3 is reflected by the combining mirror 122, and is then emitted from the first reflecting surface 171 toward the +X side along the X direction. The fourth reflecting surface 174 has a concave curve shape recessed toward an opposite side to the incident side of the blue light LB3, namely the +X side.

In the light source device 100D according to the fifth embodiment, since the fourth reflecting surface 174 has the concave curve shape recessed toward the +X side with respect to the Y-Z plane as described above, the defocus of the condensing spot of the blue light LB7 is adjusted with respect to the light source device 100A according to the first embodiment in which the fourth reflecting surface has the planar shape parallel to the Y-Z plane, and thus, it is possible to reduce the illuminance deviation of the condensing spot of the blue light LB7 on the second surface 146a of the wavelength conversion element 146. Further, in the light source device 100D according to the fifth embodiment, by reducing the illuminance deviation of the condensing spot of the blue light LB7 on the second surface 146a, it is possible to increase the light intensity of the blue light LB7 entering the wavelength conversion element 146. Further, in the light source device 100D according to the fifth embodiment, it is possible to reduce the misalignment between the light path and the light axis of the blue light LB6 and the light path and the light axis of the green light LG2 in the thickness direction of the first mirror substrate and the dielectric multilayer film of the combining mirror 122. In the light source device 100D according to the fifth embodiment, since the reflecting mirror 131 is used without using a lens similarly to the light source device 100C according to the fourth embodiment, it is possible to prevent the spherical aberration in the blue light LB5 through LB7 from occurring.

The curvature radius of the fourth reflecting surface 174 is set in accordance with sizes in the Y direction and the Z direction of the second surface 146a of the wavelength conversion element 146, the spot diameter and the desired amount of the defocus of the condensing spot of the blue light LB7, and the separation distance between the fourth reflecting surface 174 and the second surface 146a of the wavelength conversion element 146 in the X direction.

It should be noted that in each of the light source device 100B according to the second embodiment and the light source device 100G according to the third embodiment, it is possible to apply the configuration of the light source device 100D according to the fifth embodiment, and thus, it is possible for the fourth reflecting surface 174 of the reflecting mirror 131 to have the concave curve shape recessed toward the +X side. According also to such a configuration, substantially the same functions and advantages as those of the light source device 100D according to the fifth embodiment can be obtained.

Sixth Embodiment

Then, a sixth embodiment of the present disclosure will be described using FIG. 9.

Figure 9:
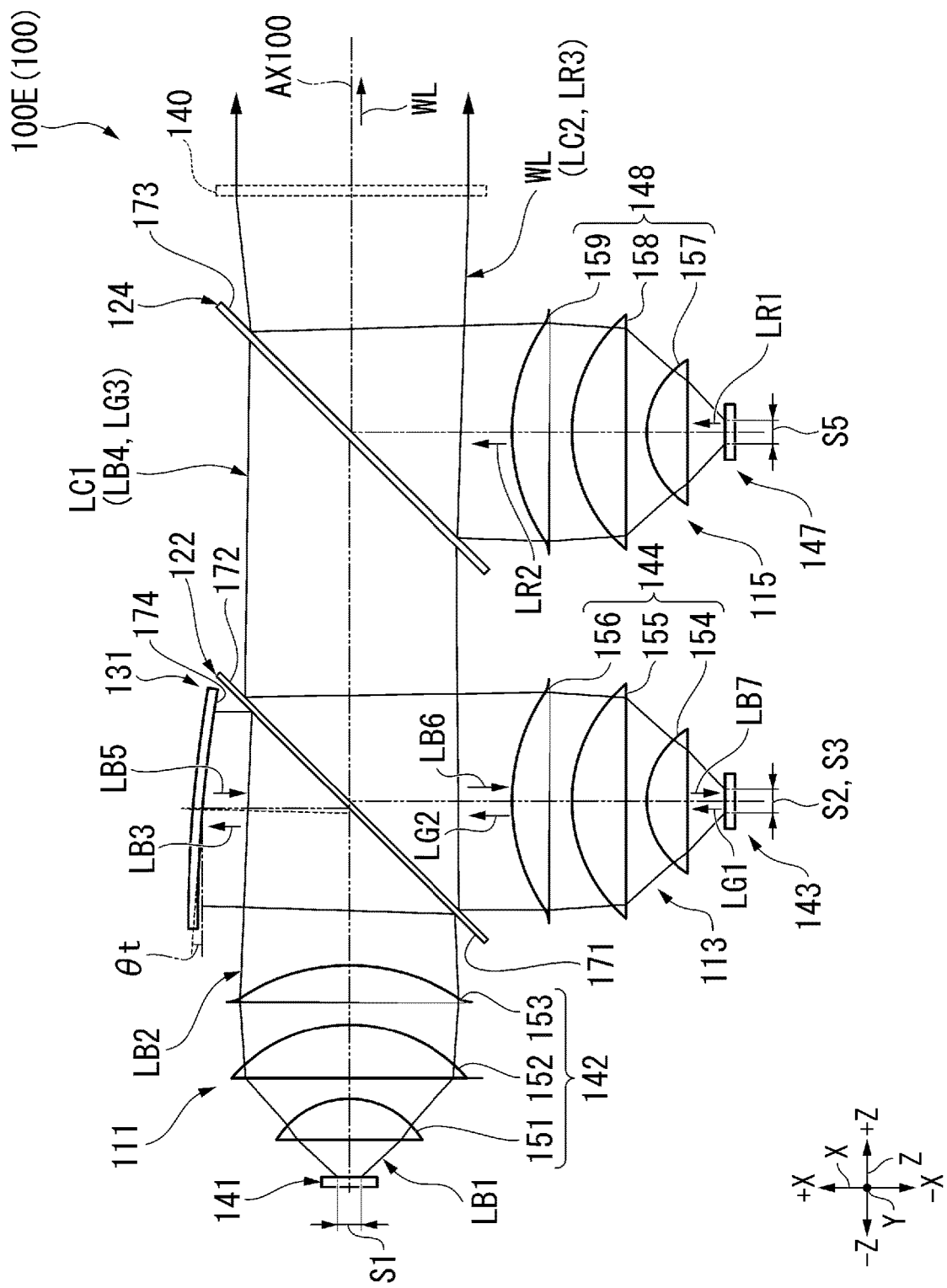
FIG. 9 is a configuration diagram of a light source device according to a sixth embodiment.

FIG. 9 is a configuration diagram of a light source device 100E according to the sixth embodiment. As shown in FIG. 9, the light source device 100E according to the sixth embodiment is provided with the light source units 111, 113, and 115, the combining mirrors 122, 124, and the reflecting mirror 131 similarly to the light source device 100C according to the fourth embodiment, and the light source device 100D according to the sixth embodiment.

In the light source device 100E, the fourth reflecting surface (a reflecting surface) 174 of the reflecting mirror 131 is curved with a predetermined curvature radius similarly to the fourth reflecting surface 174 of the reflecting mirror 131 in the light source device 100D. It should be noted that in the sixth embodiment, a surface which passes through the intersection point between the light axis of the blue light LB3 entering the fourth reflecting surface 174 and the fourth reflecting surface 174, and which has contact with the fourth reflecting surface 174 is tilted forming the angle θt with respect to the Y-Z plane, and moves from the +X side toward the −X side as proceeding from the −Z side toward the +Z side.

The behaviors and the paths of the blue light, the green light, and the red light in the light source device 100E are substantially the same as those of the light source devices 100C, 100D. It should be noted that in the light source device 100E, since the fourth reflecting surface 174 of the reflecting mirror 131 has the convex curve shape tilted with respect to the Y-Z plane and protruding toward the +X side, the centroid of the condensing spot of the blue light LB7 to be condensed on the second surface 146a of the wavelength conversion element 146, and the light intensity distribution change, and thus, the condensing spot of the blue light LB7 is defocused in the X direction. A degree of change of the centroid and an amount of the defocus of the condensing spot of the blue light LB7 vary in accordance with the curvature radius of the fourth reflecting surface 174, the angle θt, and the separation distance in the Z direction between the fourth reflecting surface 174 and the first reflecting surface 171.

The light source device 100E and the projector according to the sixth embodiment described hereinabove are provided with substantially the same configurations as those of the light source device 100A and the projector according to the first embodiment, and therefore, exert substantially the same functions and advantages as those of the light source device 100A and the projector.

Further, in the light source device 100E according to the sixth embodiment, the fourth reflecting surface 174 of the reflecting mirror 131 has the concave curve shape recessed toward the opposite side to the incident side of the blue light LB3, namely the +X side, and is tilted with respect to the Y-Z plane as a whole. According to the light source device 100E related to the sixth embodiment, it is possible to synergistically adjust the centroid and the amount of the defocus of the condensing spot of the blue light LB7 with respect to the light source device 100A according to the first embodiment in which the fourth reflecting surface has a planar shape parallel to the Y-Z plane. Therefore, according to the light source device 100E related to the sixth embodiment, by adjusting the curvature radius of the fourth reflecting surface 174 of a single reflecting mirror 131 and the angle θt representing the degree of the tilt of the fourth reflecting surface 174 with respect to the Y-Z plane, it is possible to efficiently reduce the illuminance deviation of the blue light LB7 on the second surface 146a of the wavelength conversion element 146. According to the light source device 100E related to the sixth embodiment, it is possible to irradiate a more optimum area in the second surface 146a with the blue light LB7 compared to the light source device 100C according to the fourth embodiment and the light source device 100D according to the fifth embodiment, to thereby efficiently increase the light intensity of the blue light LB7 entering the wavelength conversion element 146.

In the light source device 100E according to the sixth embodiment, by the fourth reflecting surface 174 of the reflecting mirror 131 having the concave curve shape, and being tilted as a whole with respect to the Y-Z plane as described above, it is possible to absorb the spherical aberration and the misalignment between the light path and the light axis of the blue light LB6 and the light path and the light axis of the green light LG2 in the thickness direction of the first mirror substrate and the dielectric multilayer film of the combining mirror 122. Further, in the light source device 100E according to the sixth embodiment, since the reflecting mirror 131 is used without using a lens similarly to the light source device 100C according to the fourth embodiment and the light source device 100D according to the fifth embodiment, it is possible to prevent the spherical aberration in the blue light LB5 through LB7 from occurring.

It should be noted that in each of the light source device 100B according to the second embodiment and the light source device 100G according to the third embodiment, it is possible to apply the configuration of the light source device 100E according to the sixth embodiment, and thus, it is possible for the fourth reflecting surface 174 of the reflecting mirror 131 to be arranged so as to be tilted with respect to the Y-Z plane as a whole, and at the same time, to have the concave curve shape recessed toward the +X side. According also to such a configuration, substantially the same functions and advantages as those of the light source device 100E according to the sixth embodiment can be obtained.

NUMERICAL EXAMPLES

Then, the behavior of spot light of the blue light LB7 and a result of a simulation related to the functions and advantages described above in the light source devices 100A, 100C, 100D, and 100E will be described.

Figure 10:
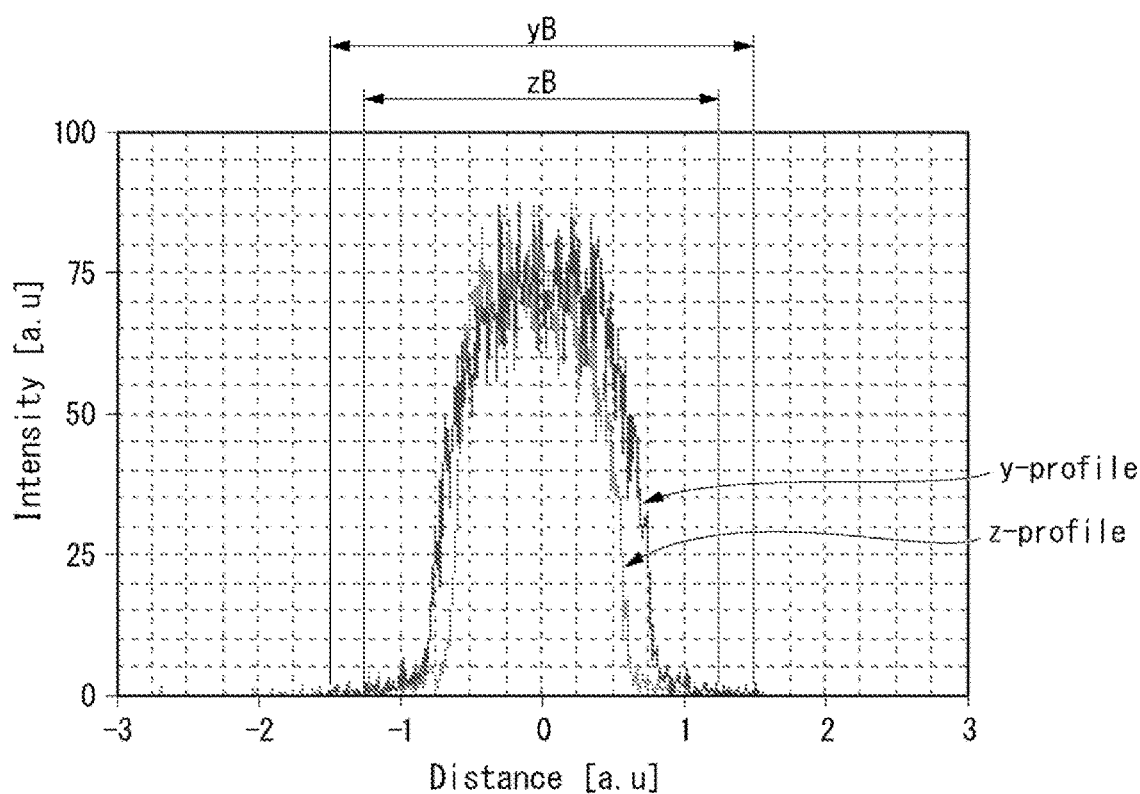
FIG. 10 is a diagram showing a result obtained by simulating a condensing state of blue light on a second surface of a wavelength conversion element in the light source device shown in FIG. 2.
Figure 11:
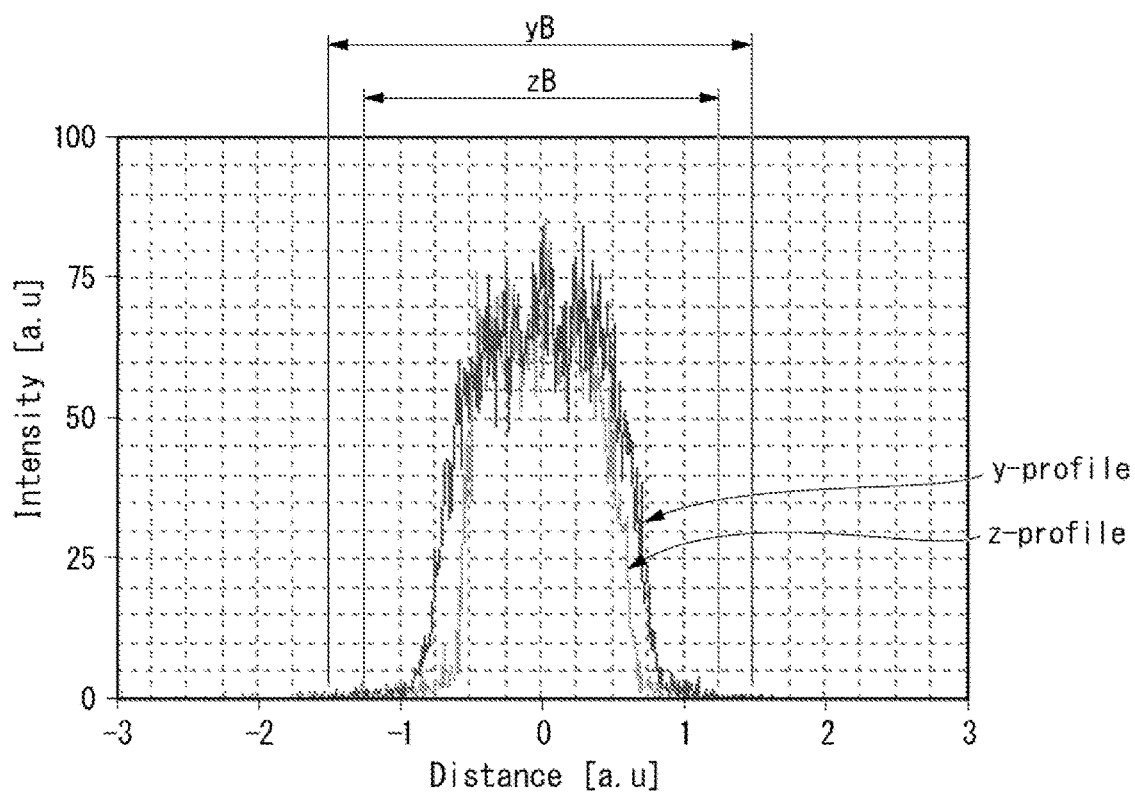
FIG. 11 is a diagram showing a result obtained by simulating a condensing state of blue light on a second surface of a wavelength conversion element in the light source device shown in FIG. 7.

FIG. 10 is a diagram showing a result obtained by calculating the light intensity distribution of the condensing spot of the blue light LB7 with which the second surface 146a of the wavelength conversion element 146 of the light source device 100A is irradiated using a simulation based on a ray tracing method. FIG. 11 is a diagram showing a result obtained by calculating the light intensity distribution of the condensing spot of the blue light LB7 with which the second surface 146a of the wavelength conversion element 146 of the light source device 100B is irradiated by performing a simulation in the same condition setting as in the simulation of the light source device 100A except the fact that the fourth reflecting surface 174 is tilted by the angle θt with respect to the Y-Z plane.

Figure 12:
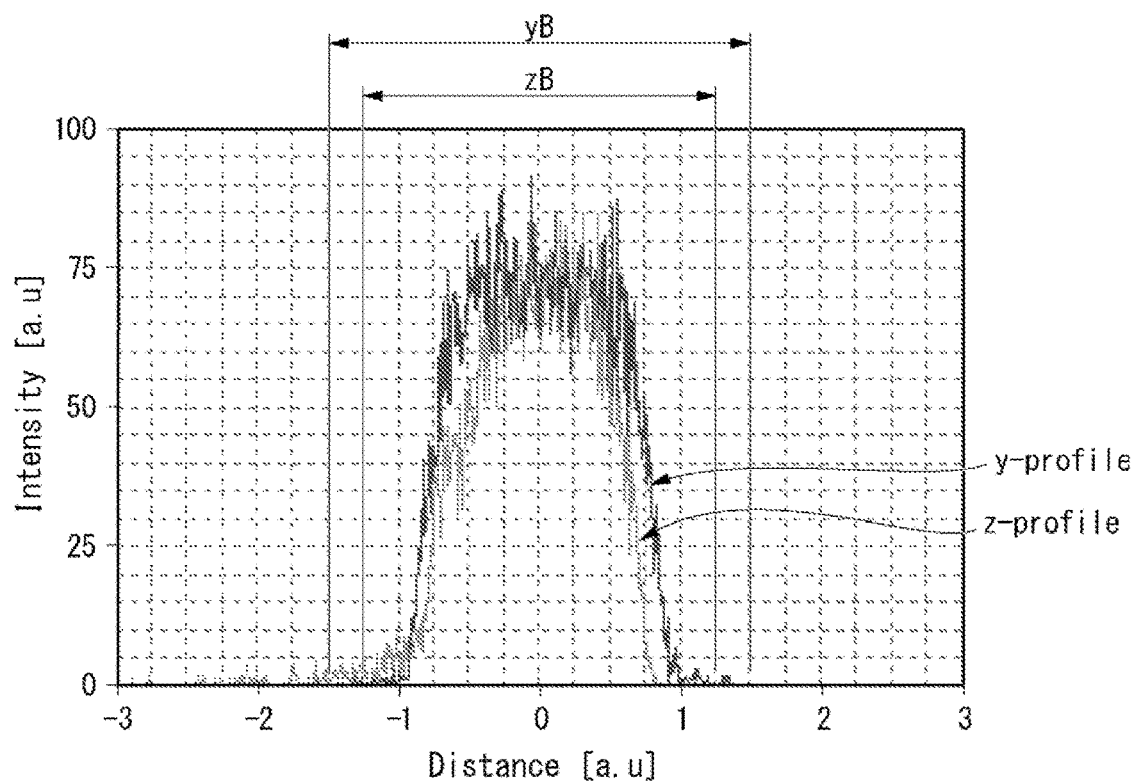
FIG. 12 is a diagram showing a result obtained by simulating a condensing state of blue light on a second surface of a wavelength conversion element in the light source device shown in FIG. 8.
Figure 13:
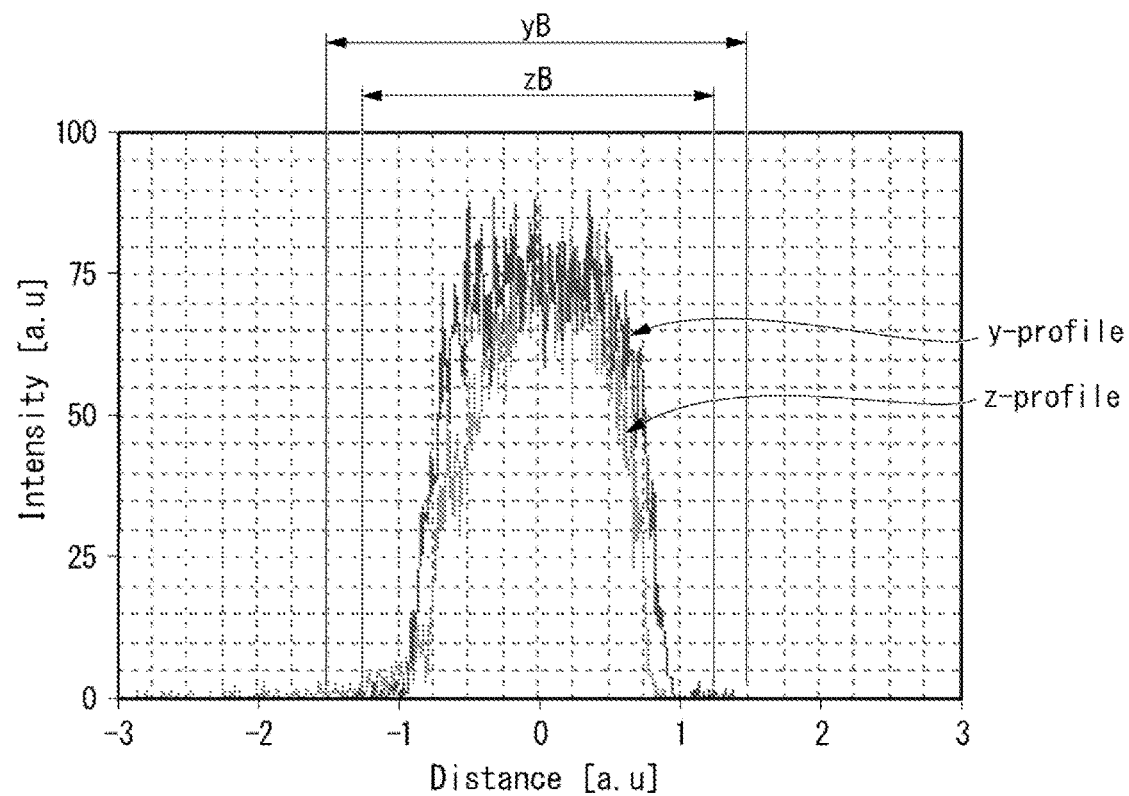
FIG. 13 is a diagram showing a result obtained by simulating a condensing state of blue light on a second surface of a wavelength conversion element in the light source device shown in FIG. 9.

FIG. 12 is a diagram showing a result obtained by calculating the light intensity distribution of the condensing spot of the blue light LB7 with which the second surface 146a of the wavelength conversion element 146 of the light source device 100C is irradiated by performing a simulation in the same condition setting as in the simulation of the light source device 100A except the fact that the fourth reflecting surface 174 has the concave curve shape recessed toward the +X side. FIG. 13 is a diagram showing a result obtained by calculating the light intensity distribution of the condensing spot of the blue light LB7 with which the second surface 146a of the wavelength conversion element 146 of the light source device 100E is irradiated by performing a simulation in the same condition setting as in the simulation of the light source device 100A except the fact that the fourth reflecting surface 174 has the concave curve shape recessed toward the +X side, and is tilted as a whole with respect to the Y-Z plane.

In the present simulation, a target area to be irradiated with the blue light LB7 is assumed as the entire second surface 146a of the wavelength conversion element 146, and is set as an area having a rectangular shape longer in the Y direction than in the Z direction. The size in the Y direction of the second surface 146a of the wavelength conversion element 146 is set as 1.55 mm, and the size in the Z direction of the second surface 146a of the wavelength conversion element 146 is set as 1.2 mm. In each of the drawings of FIG. 10 through FIG. 13, the dimension in the Y direction of the target area is expressed as yB, and the dimension in the Z direction of the target area is expressed as zB. The dimension yB is larger than the dimension zB. Further, in each of the drawings of FIG. 10 through FIG. 13, a light intensity profile in the Z direction of the blue light LB7 on the second surface 146a of the wavelength conversion element 146 is expressed as "z-profile," and a light intensity profile in the Y direction of the blue light LB7 on the second surface 146a of the wavelength conversion element 146 is expressed as "y-profile."

As is understood with reference to FIG. 10 through FIG. 13, in the Y direction, a half bandwidth of the light intensity profile of the blue light LB7 on the second surface 146a of the wavelength conversion element 146 becomes larger in the case of the light source devices 100D, 100E compared to the case of the light source devices 100A, 100C. It should be noted that in the Y direction, in either of the cases of the light source devices 100A, 100C, 100D, and 100E, the light intensity profile of the blue light LB7 spreads to both of a positive side and a negative side centering on 0 (zero) in the target area, and the centroid of the condensing spot of the blue light LB7 is located in the vicinity of 0.

In contrast, as is understood with reference to FIG. 10 through FIG. 13, in the Z direction, the half bandwidth of the light intensity profile of the blue light LB7 on the second surface 146a of the wavelength conversion element 146 becomes larger in the case of the light source devices 100A, 100C compared to the case of the light source devices 100D, 100E. As shown in FIG. 10, it is found out that in the case of the light source device 100A, in the Z direction, a rising edge at a negative region side, namely at the −Z side of 0, of the light intensity profile of the blue light LB7 is steeper than a rising edge at a positive region side, namely at the +Z side of 0, of the light intensity profile, and the centroid of the condensing spot of the blue light LB7 is located at the −Z side of 0.

As shown in FIG. 11, in the case of the light source device 100C, since the fourth reflecting surface 174 is tilted with respect to the Y-Z plane, in the Z direction, the light intensity profile of the blue light LB7 is kept in substantially the same state although slightly spread compared to the light source device 100A, and moves in whole toward the +Z side. Specifically, the centroid of the condensing spot of the blue light LB7 in the case of the light source device 100C moves toward the +Z side compared to the case of the light source device 100A, and is located in the vicinity of 0. From the result described above, it is confirmed that by tilting the fourth reflecting surface 174 with respect to the Y-Z plane, the centroid is fine adjusted in the Z direction without significantly changing the light intensity distribution of the condensing spot of the blue light LB7, and the illuminance deviation of the condensing spot of the blue light LB7 is reduced.

As shown in FIG. 12, in the case of the light source device 100D, since the reflecting mirror 131 is curved so as to be recessed toward the +X side with respect to the Y-Z plane, in the Z direction, the blue light LB7 is defocused compared to the case of the light source devices 100A, 100C, and the symmetric property of the light intensity profile of the blue light LB7 is improved. As shown in FIG. 13, in the case of the light source device 100E, since the fourth reflecting surface 174 is arranged so as to be tilted with respect to the Y-Z plane, and is curved so as to be recessed toward the +X side with respect to the Y-Z plane, in the Z direction, the symmetric property of the light intensity profile of the blue light LB7 is obtained similarly to the light source device 100D due to the synergistic effect of the curve and the tilt of the fourth reflecting surface 174, and the half bandwidth of the condensing spot of the blue light LB7 decreases, and the illuminance deviation is reduced compared to the case of the light source device 100D.

An efficiency of the blue light LB7 on the second surface 146a of the wavelength conversion element 146, a relative displacement of the centroid of the blue light LB7 with respect to the center 0 in the Z direction, and a relative displacement of the centroid of the blue light LB7 with respect to the center 0 in the Y direction of the centroid for each of the light source devices 100A, 100C, 100D, and 100E are calculated based on the data of the light intensity profile in the Y direction and the Z direction in each of FIG. 10 through FIG. 13. The "efficiency" described above represents a ratio [%] of the light intensity of the blue light LB7 entering the second surface 146a of the wavelength conversion element 146 when assuming the light intensity of the blue light LB1 emitted from the first light source 141 in each of the light source devices as 100%. Table 1 shows a result of the calculation of the efficiency of the blue light LB7 on the second surface 146a of the wavelength conversion element 146, the displacement from the center 0 in the Z direction, and the displacement from the center 0 in the Y direction for each of the light source devices 100A, 100C, 100D, and 100E.

TABLE 1

| | EFFICIENCY [%] | DISPLACEMENT IN Z DIRECTION | DISPLACEMENT IN Y DIRECTION |
|---|---|---|---|
| LIGHT SOURCE DEVICE 100A | 69.1 | −0.0544 | 0.0005 |
| LIGHT SOURCE DEVICE 100C | 68.5 | −0.0017 | 0.0022 |
| LIGHT SOURCE DEVICE 100D | 74.2 | −0.0418 | 0.0014 |
| LIGHT SOURCE DEVICE 100E | 73.8 | −0.0049 | 0.0079 |

As shown in Table 1, in the light source device 100C, by tilting the fourth reflecting surface 174 with respect to the Y-Z plane, the position of the centroid is fine adjusted in the Z direction without significantly changing the light intensity distribution of the condensing spot of the blue light LB7 compared to the case of the light source device 100A, and therefore, it is possible to obtain an efficiency comparable with the case of the light source device 100A, and at the same time, the displacements from the center 0 in the Z direction and the Y direction can be suppressed within a range of ±0.01.

As shown in Table 1, in the light source device 100D, since the symmetric property of the light intensity profile of the blue light LB7 is improved compared to the case of the light source device 100A by adopting the concave curve shape recessed toward the +X side as the shape of the fourth reflecting surface 174, the efficiency is increased. In the light source device 100E, by tilting the fourth reflecting surface 174 with respect to the Y-Z plane, and at the same time, providing the concave curve shape recessed toward the +X side to the fourth reflecting surface 174, the efficiency comparable with the case of the light source device 100C is obtained, and the displacements in the Z direction and the Y direction from the center 0 can be suppressed within a range of ±0.01.

According to the result of the simulation described above, it is confirmed that it is possible to fine adjust the position of the centroid of the condensing spot of the blue light LB7 entering the second surface 146a of the wavelength conversion element 146 to reduce the illuminance deviation of the condensing spot light of the blue light LB7 by tilting the fourth reflecting surface 174 of the reflecting mirror 131 with respect to the Y-Z plane perpendicular to the light axis of the blue light LB3 entering the fourth reflecting surface 174 in the light source devices 100A, 100C, 100D, and 100E. Further, it is confirmed that the symmetric property of the light intensity distribution of the condensing spot light of the blue light LB7 to reduce the illuminance deviation of the condensing spot light of the blue light LB7, and thus the efficiency can be increased by forming the fourth reflecting surface 174 of the reflecting mirror 131 to have the concave curve shape recessed toward the +X side in the light source devices 100A, 100C, 100D, and 100E.

As described in the fourth embodiment, the light axis of the blue light LB5 is refracted as much as an amount comparable with the thickness of the combining mirror 122, and is sifted from the light axis of the green light LG1 emitted from the wavelength conversion element 146 as much as a dimension corresponding to the thickness of the combining mirror 122 on the Y-Z plane. It is difficult to make the thickness of the combining mirror 122 thinner than a predetermined value on the grounds of the manufacturing environment and handling in the manufacturing process, and there is a substantive lower limit value in the thickness of the combining mirror 122. When the size of the optical system of the light source device is large, and the displacement of the light axis is relatively small with respect to the maximum beam width of the blue light LB7, the influence of the illuminance deviation due to the displacement of the light axis of the blue light LB7 on the efficiency of the blue light LB7 entering the wavelength conversion element 146 and the color balance of the white light WL is small. In such a case, it is possible for the fourth reflecting surface 174 of the reflecting mirror 131 to have the planar shape, and to be arranged in parallel to the Y-Z plane as in the light source device 100A.

However, when there is a certain amount of displacement of the light axis with respect to the maximum beam width of the blue light LB7 as in, for example, the optical system assumed in the numerical examples described above, there arises a illuminance deviation of the blue light LB7 having a considerable influence on the efficiency of the blue light BL7 entering the wavelength conversion element 146 and the color balance of the white light WL. When the displacement of the light axis has a certain level with respect to the maximum beam width of the blue light LB7, LB11, it is preferable to adjust the centroid of the condensing spot of the blue light LB7 and the symmetric property of the light intensity distribution to reduce the displacement of the light axis of the blue light LB7 and thus suppress the illuminance deviation by adjusting the tilt with respect to the Y-Z plane and the curvature of the fourth reflecting surface 174 of the reflecting mirror 131 as in the light source devices 100C, 100D, and 100E.

Further, as described in the first embodiment, in order to take the blue light LB1 emitted from the first light source 141 of the light source unit 111 as much as possible with the pickup optical system 142 having a certain size, the smaller the beam diameter S1 of the blue light LB1 is the more preferable, and accordingly, the smaller the size of the light emitting area of the first light source 141 is the more preferable. Similarly, in order to take the green light LG1 emitted from the wavelength conversion element 146 of the light source unit 113 as much as possible with the pickup optical system 144 having a certain size, the smaller the size of the light emitting area, namely the second surface 146a, of the wavelength conversion element 146 is the more preferable. Therefore, when the reduction in size of the light source device 100A is required due to the reduction in size of the projector 15, further reduction in size of the light emitting area of the first light source 141 and the second surface 146a of the wavelength conversion element 146 is required in order to ensure the light intensity of the white light WL. On that occasion, it is conceivable that the displacement of the light axis increases to some extent with respect to the maximum beam width of the blue light LB7. Therefore, when the projector 15 is reduced in size to be smaller than a related-art projector, it is preferable to arbitrarily adopt the configurations of the light source devices 100C, 110D, and 100E to tilt the fourth reflecting surface 174 of the reflecting mirror 131 with respect to the surface perpendicular to the light axis of the blue light LB3, or to provide the fourth reflecting surface 174 with the concave curve shape recessed toward the opposite side to the incident side of the blue light LB3. In this way, it is possible to efficiently reduce the illuminance deviation of the blue light LB7 on the second surface 146a of the wavelength conversion element 146 to thereby increase the light intensity of the blue light LB7 entering the wavelength conversion element 146 and the light intensity of the green light LG1 emitted from the wavelength conversion element 146.

Some preferred embodiments of the present disclosure are hereinabove described in detail, but the present disclosure is not limited to such specific embodiments, and there can be adopted a variety of deformations and modifications within the scope and the spirit of the present disclosure set forth in the appended claims. Further, the constituents of the plurality of embodiments can arbitrarily be combined with each other.

For example, the light source device described above is applied to the projector, but can also be applied to an image display device other than the projector in which a good color balance in the white light WL is required, and the image display device and an optical system required to be reduced in size.

A light source device according to an aspect of the present disclosure may have the following configuration.

The light source device according to an aspect of the present disclosure includes a first light source configured to emit first light having a first wavelength, a second light source configured to emit second light, a wavelength conversion element having a first surface which the second light emitted from the second light source enters and a second surface opposed to the first surface, and configured to convert the second light into third light having a second wavelength different from the first wavelength, an optical member configured to combine the first light and the third light with each other to emit combined light, and a reflecting member configured to reflect the first light emitted from the optical member toward the optical member, wherein the first light reflected by the reflecting member enters the second surface of the wavelength conversion element via the optical member, and is converted into the third light.

In the light source device according to the aspect of the present disclosure, the optical member may be configured to transmit at least a part of the first light entering the optical member, and reflect at least a part of the third light entering the optical member to generate the combined light, and reflect another part of the first light to the reflecting member.

In the light source device according to the aspect of the present disclosure, the optical member may be configured to reflect at least a part of the first light entering the optical member, transmit at least a part of the third light entering the optical member to generate the combined light, and reflect another part of the first light to the reflecting member.

In the light source device according to the aspect of the present disclosure, the reflecting member may have a reflecting surface configured to reflect the first light toward the optical member, and the reflecting surface may be tilted with respect to a surface perpendicular to a light axis of the first light.

In the light source device according to the aspect of the present disclosure, the reflecting member may have a reflecting surface configured to reflect the first light toward the optical member, and the reflecting surface may have a concave curve shape recessed toward an opposite side to an incident side of the first light.

In the light source device according to the aspect of the present disclosure, the optical member may be arranged between the wavelength conversion element and the reflecting member in a first direction, the first light source may be arranged at a distance from the optical member in a second direction perpendicular to the first direction, the second surface may be arranged at a side facing to the reflecting member of the wavelength conversion element in the first direction, and the second light source may be arranged at an opposite side to the side facing to the reflecting member of the wavelength conversion element in the first direction, and overlaps the wavelength conversion element, the reflecting member, and the optical member in the first direction.

In the light source device according to the aspect of the present disclosure, the first surface of the wavelength conversion element and an exit surface where the second light is emitted from the second light source may have contact with each other.

A projector according to an aspect of the present disclosure may have the following configuration.

The projector according to an aspect of the present disclosure includes the light source device described above, a light modulation device configured to modulate light from the light source device in accordance with image information to thereby form image light, and a projection optical system configured to project the image light.

What is claimed is:

1. A light source device comprising:
a first light source configured to emit first light having a first wavelength;
a second light source configured to emit second light;
a wavelength conversion element having a first surface which the second light emitted from the second light source enters and a second surface located at an opposite side to the first surface, the wavelength conversion element being configured to convert the second light into third light having a second wavelength different from the first wavelength;
an optical member configured to combine the first light and the third light with each other to emit combined light; and
a reflecting member configured to reflect, toward the optical member, the first light which is a part of the first light emitted from the first light source and which is emitted from the optical member, wherein
the first light reflected by the reflecting member enters the second surface of the wavelength conversion element via the optical member, and is converted into the third light, and
the optical member is configured to transmit a part of the first light entering the optical member, and reflect at least a part of the third light entering the optical member to generate the combined light, and reflect another part of the first light entering the optical member to the reflecting member.

2. A light source device comprising:
a first light source configured to emit first light having a first wavelength;
a second light source configured to emit second light;
a wavelength conversion element having a first surface which the second light emitted from the second light source enters and a second surface located at an opposite side to the first surface, the wavelength conversion element being configured to convert the second light into third light having a second wavelength different from the first wavelength;
an optical member configured to combine the first light and the third light with each other to emit combined light; and
a reflecting member configured to reflect, toward the optical member, the first light which is a part of the first light emitted from the first light source and which is emitted from the optical member, wherein
the first light reflected by the reflecting member enters the second surface of the wavelength conversion element via the optical member, and is converted into the third light, and
the optical member is configured to reflect a part of the first light entering the optical member, and transmit at least a part of the third light entering the optical member to generate the combined light, and transmit another part of the first light entering the optical member toward the reflecting member.

3. The light source device according to claim 1, wherein
the reflecting member has a reflecting surface configured to reflect the first light toward the optical member, and
the reflecting surface is tilted with respect to a surface perpendicular to a light axis of the first light.

4. A light source device comprising:
a first light source configured to emit first light having a first wavelength;
a second light source configured to emit second light;
a wavelength conversion element having a first surface which the second light emitted from the second light source enters and a second surface located at an opposite side to the first surface, the wavelength conversion element being configured to convert the second light into third light having a second wavelength different from the first wavelength;
an optical member configured to combine the first light and the third light with each other to emit combined light; and
a reflecting member configured to reflect, toward the optical member, the first light which is a part of the first light emitted from the first light source and which is emitted from the optical member, wherein
the first light reflected by the reflecting member enters the second surface of the wavelength conversion element via the optical member, and is converted into the third light,
the reflecting member has a reflecting surface configured to reflect the first light toward the optical member, and
the reflecting surface is tilted with respect to the second surface of the wavelength conversion element.

5. The light source device according to claim 1, wherein
the reflecting member has a reflecting surface configured to reflect the first light toward the optical member, and
the reflecting surface has a concave curve shape recessed toward an opposite side to an incident side of the first light.

6. The light source device according to claim 5, wherein
the reflecting surface is tilted with respect to a surface perpendicular to a light axis of the first light.

7. The light source device according to claim 1, wherein
the second light source, the wavelength conversion element, the optical member, and the reflecting member are arranged in alignment with each other.

8. The light source device according to claim 1, wherein
the optical member is arranged between the wavelength conversion element and the reflecting member along a first direction, the first light source is separated from the optical member along a second direction perpendicular to the first direction, the second surface is directed to the reflecting member, and the second light source is arranged at an opposite side to the reflecting member side with respect to the wavelength conversion element, the second light source overlapping the wavelength conversion element, the reflecting member, and the optical member in the first direction.

9. The light source device according to claim 1, wherein the first surface of the wavelength conversion element and an exit surface where the second light is emitted from the second light source have contact with each other.

10. A projector comprising:

the light source device according to claim 1;

a light modulation device configured to modulate light emitted from the light source device; and a projection optical system configured to project the light modulated by the light modulation device.

* * * * *